(12) United States Patent
Huynh

(10) Patent No.: US 11,897,611 B2
(45) Date of Patent: Feb. 13, 2024

(54) DISTRIBUTED TRAILING EDGE ACTUATION SYSTEMS AND METHODS FOR AIRCRAFT

(71) Applicant: The Boeing Company, Chicago, IL (US)

(72) Inventor: Neal V. Huynh, Bellevue, WA (US)

(73) Assignee: The Boeing Company, Arlington, VA (US)

( * ) Notice: Subject to any disclaimer, the term of this patent is extended or adjusted under 35 U.S.C. 154(b) by 204 days.

(21) Appl. No.: 17/408,019

(22) Filed: Aug. 20, 2021

(65) Prior Publication Data

US 2022/0212782 A1    Jul. 7, 2022

Related U.S. Application Data

(60) Provisional application No. 63/134,824, filed on Jan. 7, 2021.

(51) Int. Cl.
*B64C 9/20* (2006.01)
*B64C 13/50* (2006.01)
*B64C 13/42* (2006.01)

(52) U.S. Cl.
CPC .............. *B64C 9/20* (2013.01); *B64C 13/42* (2013.01); *B64C 13/504* (2018.01); *B64C 13/505* (2018.01)

(58) Field of Classification Search
CPC .... B64C 9/16; B64C 9/18; B64C 9/20; B64C 13/504
See application file for complete search history.

(56) References Cited

U.S. PATENT DOCUMENTS

| 8,511,608 B1* | 8/2013 | Good ................. B64C 9/16 244/99.3 |
| 2018/0362149 A1* | 12/2018 | Huynh ................ B64C 13/42 |
| 2021/0086889 A1 | 3/2021 | Huynh |

* cited by examiner

*Primary Examiner* — Nicholas McFall
(74) *Attorney, Agent, or Firm* — Hanley, Flight & Zimmerman, LLC

(57) ABSTRACT

Distributed trailing edge actuation systems and methods for aircraft are described herein. An example aircraft includes a wing, a flap coupled to the wing, the flap movable between a stowed position and a deployed position, and a distributed trailing edge (DTE) actuation system including a flap actuator coupled to the wing to move the flap. The flap actuator includes an integrated hydraulic powered actuator and electric powered actuator. The flap actuator is operable in a hydraulic powered mode in which the hydraulic powered actuator is activated to move the flap, an electric powered mode in which the electric powered actuator is activated to move the flap, and a hybrid mode in which the hydraulic powered actuator and the electric powered actuator are activated simultaneously to move the flap.

21 Claims, 17 Drawing Sheets

| Case 1 | | ACE 1 | ACE 2 | ACE 3 | ACE 4 |
|---|---|---|---|---|---|
| OB Left Flap | OB Actr | 1 | 0 | | |
| | IB Actr | 1 | 0 | | |
| OB Right Flap | OB Actr | 1 | 0 | | |
| | IB Actr | 1 | 0 | | |
| IB Left Flap | OB Actr | | | 0 | 0 |
| | IB Actr | | | 0 | 0 |
| IB Right Flap | OB Actr | | | 0 | 0 |
| | IB Actr | | | 0 | 0 |
| Flight deck message | | No | | | |

| Case 2 | | ACE 1 | ACE 2 | ACE 3 | ACE 4 |
|---|---|---|---|---|---|
| OB Left Flap | OB Actr | 1 | 1 | | |
| | IB Actr | 1 | 1 | | |
| OB Right Flap | OB Actr | 1 | 1 | | |
| | IB Actr | 1 | 1 | | |
| IB Left Flap | OB Actr | | | 0 | 0 |
| | IB Actr | | | 0 | 0 |
| IB Right Flap | OB Actr | | | 0 | 0 |
| | IB Actr | | | 0 | 0 |
| Flight deck message | | Yes | | | |

| Case 3 | | ACE 1 | ACE 2 | ACE 3 | ACE 4 |
|---|---|---|---|---|---|
| OB Left Flap | OB Actr | 1 | 0 | | |
| | IB Actr | 1 | 0 | | |
| OB Right Flap | OB Actr | 1 | 0 | | |
| | IB Actr | 1 | 0 | | |
| IB Left Flap | OB Actr | | | 1 | 1 |
| | IB Actr | | | 1 | 1 |
| IB Right Flap | OB Actr | | | 1 | 1 |
| | IB Actr | | | 1 | 1 |
| Flight deck message | | No | | | |

| Case 4 | | ACE 1 | ACE 2 | ACE 3 | ACE 4 |
|---|---|---|---|---|---|
| OB Left Flap | OB Actr | 1 | 0 | | |
| | IB Actr | 1 | 0 | | |
| OB Right Flap | OB Actr | 1 | 0 | | |
| | IB Actr | 1 | 0 | | |
| IB Left Flap | OB Actr | | | 0 | 1 |
| | IB Actr | | | 0 | 1 |
| IB Right Flap | OB Actr | | | 0 | 1 |
| | IB Actr | | | 0 | 1 |
| Flight deck message | | No | | | |

FIG. 12A

| Case 5 | | ACE 1 | ACE 2 | ACE 3 | ACE 4 |
|---|---|---|---|---|---|
| OB Left Flap | OB Actr | 0 | 1 | | |
| | IB Actr | 0 | 1 | | |
| OB Right Flap | OB Actr | 0 | 1 | | |
| | IB Actr | 0 | 1 | | |
| IB Left Flap | OB Actr | | | 0 | 0 |
| | IB Actr | | | 0 | 0 |
| IB Right Flap | OB Actr | | | 0 | 0 |
| | IB Actr | | | 0 | 0 |
| Flight deck message | | \multicolumn{4}{c}{No} | | | |

| Case 6 | | ACE 1 | ACE 2 | ACE 3 | ACE 4 |
|---|---|---|---|---|---|
| OB Left Flap | OB Actr | 1 | 1 | | |
| | IB Actr | 1 | 1 | | |
| OB Right Flap | OB Actr | 1 | 1 | | |
| | IB Actr | 1 | 1 | | |
| IB Left Flap | OB Actr | | | 0 | 0 |
| | IB Actr | | | 0 | 0 |
| IB Right Flap | OB Actr | | | 0 | 0 |
| | IB Actr | | | 0 | 0 |
| Flight deck message | | | | | Yes |

| Case 7 | | ACE 1 | ACE 2 | ACE 3 | ACE 4 |
|---|---|---|---|---|---|
| OB Left Flap | OB Actr | 0 | 1 | | |
| | IB Actr | 0 | 1 | | |
| OB Right Flap | OB Actr | 0 | 1 | | |
| | IB Actr | 0 | 1 | | |
| IB Left Flap | OB Actr | | | 1 | 0 |
| | IB Actr | | | 1 | 0 |
| IB Right Flap | OB Actr | | | 1 | 0 |
| | IB Actr | | | 1 | 0 |
| Flight deck message | | | | | No |

| Case 8 | | ACE 1 | ACE 2 | ACE 3 | ACE 4 |
|---|---|---|---|---|---|
| OB Left Flap | OB Actr | 1 | 0 | | |
| | IB Actr | 1 | 0 | | |
| OB Right Flap | OB Actr | 1 | 0 | | |
| | IB Actr | 1 | 0 | | |
| IB Left Flap | OB Actr | | | 0 | 1 |
| | IB Actr | | | 0 | 1 |
| IB Right Flap | OB Actr | | | 0 | 1 |
| | IB Actr | | | 0 | 1 |
| Flight deck message | | | | | No |

FIG. 12B

| Case 9 | | ACE 1 | ACE 2 | ACE 3 | ACE 4 |
|---|---|---|---|---|---|
| OB Left Flap | OB Actr | 0 | | | |
| | IB Actr | 0 | | | |
| OB Right Flap | OB Actr | 0 | | | |
| | IB Actr | 0 | | | |
| IB Left Flap | OB Actr | | | 1 | 0 |
| | IB Actr | | | 1 | 0 |
| IB Right Flap | OB Actr | | | 1 | 0 |
| | IB Actr | | | 1 | 0 |
| Flight deck message | | | No | | |

| Case 10 | | ACE 1 | ACE 2 | ACE 3 | ACE 4 |
|---|---|---|---|---|---|
| OB Left Flap | OB Actr | 1 | 0 | | |
| | IB Actr | 1 | 0 | | |
| OB Right Flap | OB Actr | 1 | 0 | | |
| | IB Actr | 1 | 0 | | |
| IB Left Flap | OB Actr | | | 1 | 0 |
| | IB Actr | | | 1 | 0 |
| IB Right Flap | OB Actr | | | 1 | 0 |
| | IB Actr | | | 1 | 0 |
| Flight deck message | | | No | | |

| Case 11 | | ACE 1 | ACE 2 | ACE 3 | ACE 4 |
|---|---|---|---|---|---|
| OB Left Flap | OB Actr | 0 | 1 | | |
| | IB Actr | 0 | 1 | | |
| OB Right Flap | OB Actr | 0 | 1 | | |
| | IB Actr | 0 | 1 | | |
| IB Left Flap | OB Actr | | | 1 | 0 |
| | IB Actr | | | 1 | 0 |
| IB Right Flap | OB Actr | | | 1 | 0 |
| | IB Actr | | | 1 | 0 |
| Flight deck message | | | No | | |

| Case 12 | | ACE 1 | ACE 2 | ACE 3 | ACE 4 |
|---|---|---|---|---|---|
| OB Left Flap | OB Actr | 0 | 0 | | |
| | IB Actr | 0 | 0 | | |
| OB Right Flap | OB Actr | 0 | 0 | | |
| | IB Actr | 0 | 0 | | |
| IB Left Flap | OB Actr | | | 1 | 1 |
| | IB Actr | | | 1 | 1 |
| IB Right Flap | OB Actr | | | 1 | 1 |
| | IB Actr | | | 1 | 1 |
| Flight deck message | | | Yes | | |

FIG. 12C

| Case 13 | | ACE 1 | ACE 2 | ACE 3 | ACE 4 |
|---|---|---|---|---|---|
| OB Left Flap | OB Actr | 0 | | | |
| | IB Actr | 0 | | | |
| OB Right Flap | OB Actr | 0 | | | |
| | IB Actr | 0 | | | |
| IB Left Flap | OB Actr | | | 0 | 1 |
| | IB Actr | | | 0 | 1 |
| IB Right Flap | OB Actr | | | 0 | 1 |
| | IB Actr | | | 0 | 1 |
| Flight deck message | | No | | | |

| Case 14 | | ACE 1 | ACE 2 | ACE 3 | ACE 4 |
|---|---|---|---|---|---|
| OB Left Flap | OB Actr | 1 | 0 | | |
| | IB Actr | 1 | 0 | | |
| OB Right Flap | OB Actr | 1 | 0 | | |
| | IB Actr | 1 | 0 | | |
| IB Left Flap | OB Actr | | | 0 | 1 |
| | IB Actr | | | 0 | 1 |
| IB Right Flap | OB Actr | | | 0 | 1 |
| | IB Actr | | | 0 | 1 |
| Flight deck message | | No | | | |

| Case 15 | | ACE 1 | ACE 2 | ACE 3 | ACE 4 |
|---|---|---|---|---|---|
| OB Left Flap | OB Actr | 0 | 1 | | |
| | IB Actr | 0 | 1 | | |
| OB Right Flap | OB Actr | 0 | 1 | | |
| | IB Actr | 0 | 1 | | |
| IB Left Flap | OB Actr | | | 0 | 1 |
| | IB Actr | | | 0 | 1 |
| IB Right Flap | OB Actr | | | 0 | 1 |
| | IB Actr | | | 0 | 1 |
| Flight deck message | | No | | | |

| Case 16 | | ACE 1 | ACE 2 | ACE 3 | ACE 4 |
|---|---|---|---|---|---|
| OB Left Flap | OB Actr | 0 | 0 | | |
| | IB Actr | 0 | 0 | | |
| OB Right Flap | OB Actr | 0 | 0 | | |
| | IB Actr | 0 | 0 | | |
| IB Left Flap | OB Actr | | | 1 | 1 |
| | IB Actr | | | 1 | 1 |
| IB Right Flap | OB Actr | | | 1 | 1 |
| | IB Actr | | | 1 | 1 |
| Flight deck message | | Yes | | | |

CASE 1: OB Actr of OB Left Flap fails

|  | OB Left Flap | IB Left Flap | IB Right Flap | OB Right Flap |
|---|---|---|---|---|
| OB Actr | 1 | 0 | 0 | 0 |
| IB Actr | 0 | 0 | 0 | 0 |
| Flight deck message | Yes | | | |

CASE 2: IB Actr of OB Left Flap fails

|  | OB Left Flap | IB Left Flap | IB Right Flap | OB Right Flap |
|---|---|---|---|---|
| OB Actr | 0 | 0 | 0 | 0 |
| IB Actr | 1 | 0 | 0 | 0 |
| Flight deck message | Yes | | | |

CASE 3: OB Actr of IB Left Flap fails

|  | OB Left Flap | IB Left Flap | IB Right Flap | OB Right Flap |
|---|---|---|---|---|
| OB Actr | 0 | 1 | 0 | 0 |
| IB Actr | 0 | 0 | 0 | 0 |
| Flight deck message | Yes | | | |

CASE 4: IB Actr of IB Left Flap fails

|  | OB Left Flap | IB Left Flap | IB Right Flap | OB Right Flap |
|---|---|---|---|---|
| OB Actr | 0 | 0 | 0 | 0 |
| IB Actr | 0 | 1 | 0 | 0 |
| Flight deck message | Yes | | | |

CASE 5: OB Actr of IB Right Flap fails

|  | OB Left Flap | IB Left Flap | IB Right Flap | OB Right Flap |
|---|---|---|---|---|
| OB Actr | 0 | 0 | 1 | 0 |
| IB Actr | 0 | 0 | 0 | 0 |
| Flight deck message | Yes | | | |

CASE 6: IB Actr of IB Left Flap fails

|  | OB Left Flap | IB Left Flap | IB Right Flap | OB Right Flap |
|---|---|---|---|---|
| OB Actr | 0 | 0 | 0 | 0 |
| IB Actr | 0 | 0 | 1 | 0 |
| Flight deck message | Yes | | | |

CASE 7: OB Actr of OB Left Flap fails

|  | OB Left Flap | IB Left Flap | IB Right Flap | OB Right Flap |
|---|---|---|---|---|
| OB Actr | 0 | 0 | 0 | 1 |
| IB Actr | 0 | 0 | 0 | 0 |
| Flight deck message | Yes | | | |

CASE 8: IB Actr of OB Left Flap fails

|  | OB Left Flap | IB Left Flap | IB Right Flap | OB Right Flap |
|---|---|---|---|---|
| OB Actr | 0 | 0 | 0 | 0 |
| IB Actr | 0 | 0 | 0 | 1 |
| Flight deck message | Yes | | | | ns

DISTRIBUTED TRAILING EDGE ACTUATION SYSTEMS AND METHODS FOR AIRCRAFT

RELATED APPLICATION

This patent claims the benefit under 35 U.S.C. § 119(e) to U.S. Provisional Application No. 63/134,824, titled "Distributed Trailing Edge Actuation Systems and Methods for Aircraft," filed Jan. 7, 2021, which is hereby incorporated by this reference in its entirety.

FIELD OF THE DISCLOSURE

This disclosure relates generally to aircraft and, more particularly, to distributed trailing edge systems and methods for aircraft.

BACKGROUND

Many aircraft employ high lift devices, sometimes referred to as auxiliary airfoils or movable control surfaces, along the leading and trailing edges of the wings. For example, flaps are a common type of high lift device that are movably coupled along the trailing edge of a wing. The flaps may be moved (e.g., tilted) downward from the trailing edge of the wing to change the shape of the wing to generate more or less lift. The flaps are often deployed during takeoff and landing, for instance, to generate more lift at slower speeds.

SUMMARY

An example aircraft disclosed herein includes a wing, a flap coupled to the wing, the flap movable between a stowed position and a deployed position, and a distributed trailing edge (DTE) actuation system including a flap actuator coupled to the wing to move the flap. The flap actuator includes an integrated hydraulic powered actuator and electric powered actuator. The flap actuator is operable in a hydraulic powered mode in which the hydraulic powered actuator is activated to move the flap, an electric powered mode in which the electric powered actuator is activated to move the flap, and a hybrid mode in which the hydraulic power actuator and the electric powered actuator are activated simultaneously to move the flap.

An example aircraft disclosed herein includes a left wing, a right wing, flaps movable relative to trailing edges of the left and right wings, and a distributed trailing edge (DTE) actuation system including flap actuators coupled to the left and right wings to move the flaps. Each of the flap actuators is a rotary actuator including an integrated hydraulic powered actuator and electric powered actuator. The DTE actuation system also includes actuator control electronics (ACEs), wherein each of the hydraulic powered actuators of the flap actuators is controllable by at least two of the ACEs.

An example method disclosed herein includes determining an engine of an aircraft has failed. The failure of the engine causes a reduction in hydraulic power in an aircraft hydraulic system. The aircraft includes a flap actuator to move a flap relative to a trailing edge of a wing. The flap actuator includes an integrated hydraulic powered actuator and electric powered actuator. The example method further includes, in response to determining the engine has failed, operating the flap actuator in a hybrid mode in which the hydraulic powered actuator and the electric powered actuator are activated simultaneously to move the flap.

An example flap actuator for an aircraft is disclosed herein. The flap actuator includes a crank arm rotatable about an axis. The crank arm is to be coupled to a flap of the aircraft via a linkage assembly. The flap actuator also includes a hydraulic powered actuator coupled to the crank arm. The hydraulic powered actuator is to rotate the crank arm when activated. The flap actuator further includes an electric powered actuator coupled to the crank arm. The electric powered actuator is to rotate the crank arm when activated.

An example aircraft disclosed herein includes a wing, a flap, and a rotary flap actuator coupled to the wing. The rotary flap actuator is to move the flap between a stowed position and a deployed position. The rotary flap actuator includes an integrated hydraulic powered actuator and electric powered actuator.

An example flap actuator for an aircraft is disclosed herein. The flap actuator includes a crank arm, a hydraulic powered actuator coupled to the crank arm, and an electric powered actuator coupled to the crank arm. The hydraulic powered actuator and the electric powered actuator are simultaneously operable to rotate the crank arm.

BRIEF DESCRIPTION OF THE DRAWINGS

FIG. 2A show components of the DTE control system for hydraulically controlling one or more flap actuators of the aircraft of FIG. 1.

FIG. 3A shows the example flap in a stowed position.

FIG. 4A shows a partial cross-sectional view of an example hydraulic powered actuator of the example flap actuator and a schematic diagram of an example hydraulic control module used to control the hydraulic powered actuator. FIG. 4A shows an example valve of the example hydraulic control module in a first state in which pressurized hydraulic fluid is supplied to the example hydraulic powered actuator to move an example crank arm in a first direction.

FIG. 5 shows the example hydraulic powered actuator and an example electric powered actuator of the example flap actuator.

FIGS. 12A-12D are tables of cases that can be utilized in connection with the example flowchart in FIG. 7.

FIG. 13 is a table of cases that can be utilized in connection with the example flowchart in FIG. 8.

Figure 1:
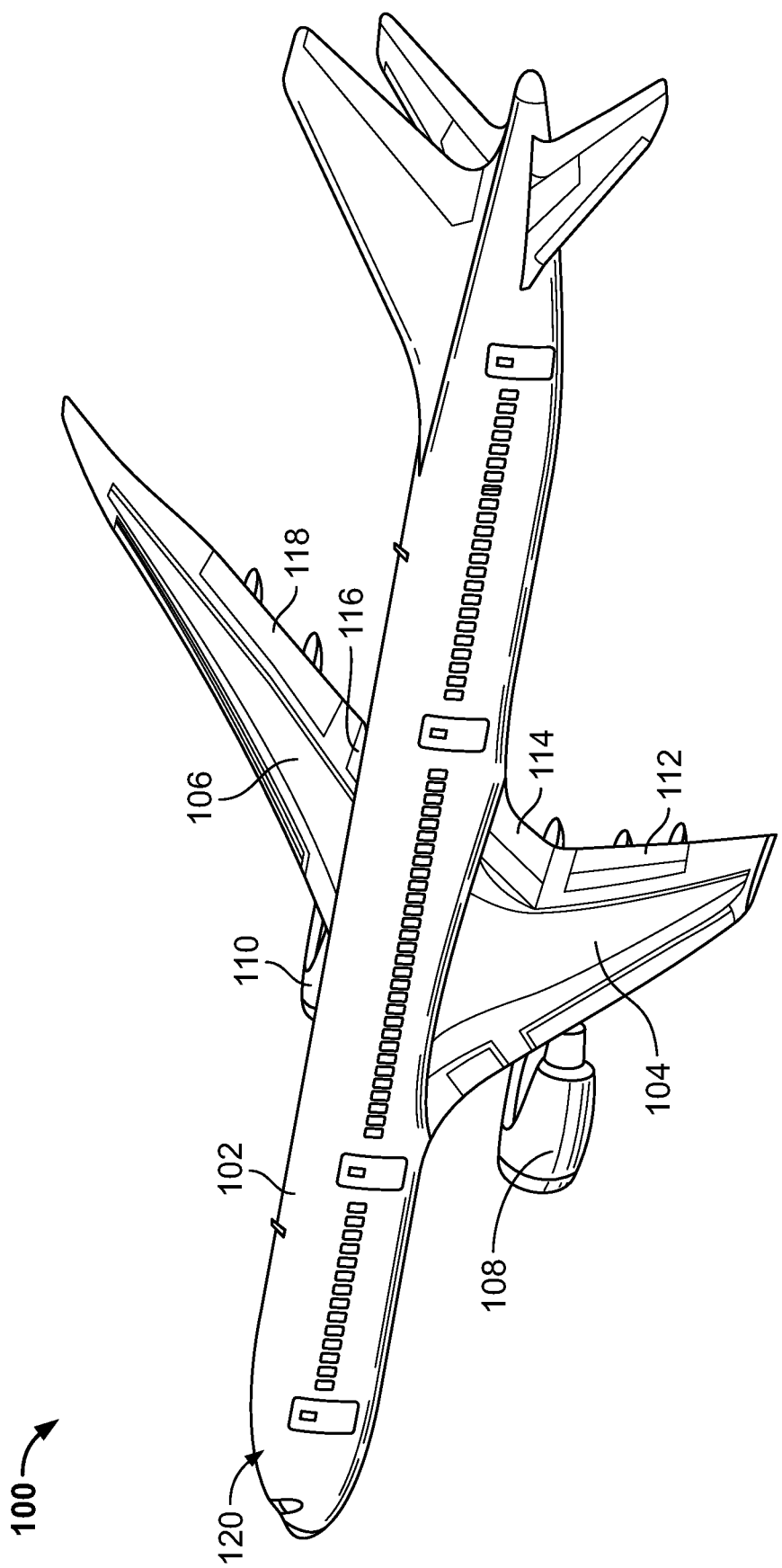
FIG. 1 illustrates an example aircraft in which the examples disclosed herein can be implemented.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Disclosed herein are example distributed trailing edge (DTE) actuation systems and methods for aircraft. With the advances in composite material and manufacturing, most modern aircraft are designed with thinner, lighter wings for performance benefits. The example systems disclosed herein have reduced spatial requirements, which enables the construction of these thinner, lighter wings for the aircraft, which are generally more aerodynamically efficient than thicker, heavier wings. The example systems and methods disclosed herein include independently controllable flap actuators that enhance control of the flap actuation operations. Further, the example systems and methods disclosed herein utilize a redundant architecture that enables continued functionality (or at least partial functionality) in the event of a failure of one or more components or systems.

Aircraft typically include one or more flaps (e.g., outboard flaps and/or inboard flaps) located at and/or along the trailing edges of the wings. The flaps can be moved between a stowed position and one or more deployed positions to change the lift generated by the wings. The flaps are typically deployed during takeoff and landing, for example. The flaps are moved via a trailing edge actuation system. Some known trailing edge actuation systems include a series of geared rotary actuators (GRAs) arranged along the wings to move the flaps. The GRAs are coupled via a series of a torque tubes to a power drive unit. When the power drive unit is activated, the power drive unit rotates the series of torque tubes, which drives all of the GRAs simultaneously to move the flaps in unison.

These known systems and components require a significant amount of space behind the rear spar of the wing. Thus, the spatial integration of such hardware requires thicker wings, which are generally less efficient than thinner wings. Additionally, these known trailing edge actuation systems require multiple sub-assemblies (e.g., torque tubes, couplings, angle bear boxes, universal joints, and ball screws, etc.), all of which require significant labor installation hours.

Disclosed herein are example DTE actuation systems and methods that include independently controllable flap actuators. The example flap actuators can be activated to move the flaps independently or simultaneously between their stowed and deployed positions. In some examples, multiple flap actuators are associated with the same flap. In such instances, the flap actuators can be activated in parallel to move the respective flap.

The example flap actuators and associated linkage assemblies disclosed herein utilize less space than known actuators. As such, the examples disclosed herein enable the construction of thinner, lighter wings, which produce more efficient flight. The example flap actuators are also easier to install and, thus, reduce build time of aircraft with high production rates.

The example DTE actuation systems and methods disclosed herein include multiple levels of redundancy that improve fault tolerance and enable the continuous operation (or partial operation) of one or more components of the DTE system even if one or more failures occur. In some examples, the flap actuators disclosed herein are hybrid hydraulic-electric actuators that that include an integrated hydraulic powered actuator and electric powered actuator. Each of the flap actuators can be operated in multiple modes including a hydraulic powered mode, an electric powered mode, and a hybrid mode. In the hydraulic powered mode, hydraulic power is used to activate the hydraulic powered actuator to move the flap while the electric powered actuator is inactive, off, or bypassed. In the electric powered mode, electrical power is used to activate the electric powered actuator to move the flap while the hydraulic powered actuator is inactive, off, or bypassed. In the hybrid mode, both the hydraulic powered actuator and the electric powered actuator are activated simultaneously, such that the hydraulic powered actuator and the electric powered actuator act in combination to move the flap. The flap actuator can be switched between the different powered modes if a failure occurs that affects one of the actuators. For example, if the hydraulic powered actuator and/or one of its associated control components fails, the flap actuator can be operated in the electric powered mode in which the electric powered actuator is used. In another example, both the hydraulic powered actuator and the electric powered actuator can be used in combination. For example, if one of the engines fails, the total hydraulic power in the aircraft is reduced. In such an instance, the flap actuator can be switched to its hybrid mode, where the electric powered actuator is activated in combination with the hydraulic powered actuator to compensate for the loss of power.

Further, the example DTE actuation systems disclosed herein include a DTE control system with redundant actuator control electronics (ACEs). As a result, if one of the ACEs associated with a flap actuator fails, another ACE can be used to hydraulically and/or or electrically control the hydraulic and electric powered actuators of the flap actuator. Depending on the type and number of failures, the DTE control system can switch the flap actuators between the different modes.

As used herein, the term "switch" refers to a mechanical and/or electrical device, component, software implementation, and/or assembly that enables a change in a mode of operation of a device coupled thereto. As used herein, the term "actuator" refers to a device, component, and/or assembly used to convert energy (e.g., electrical energy, fluid/pressure energy, etc.) into motion. Accordingly, the terms "electric powered actuator" and "electric actuator" refer to an actuator that converts electrical power or energy into motion, while the terms "hydraulic powered actuator" and "hydraulic actuator" refer to an actuator that converts hydraulic pressure into motion.

FIG. 1 illustrates an example aircraft 100 in which the examples disclosed herein can be implemented. In the illustrated example, the aircraft 100 includes a fuselage 102, a left wing 104 coupled to the fuselage 102, and a right wing 106 coupled to the fuselage 102. The aircraft 100 also includes a first engine 108 coupled to the left wing 104 and a second engine 110 coupled to the right wing 106. In other examples, the aircraft 100 may have multiple engines coupled to each of the left and right wings 104, 106 and/or disposed in other locations on the aircraft 100 (e.g., coupled to the fuselage 102, coupled to a tail section of the aircraft 100, etc.). In addition to producing thrust, each of the engines 108, 110 drives one or more engine driven pumps for producing pressurized hydraulic fluid for use by one or more systems of the aircraft 100. Further, each of the engines 108, 110 drives one or more generators for producing electrical power for use by one or more electrical motor pumps for producing pressurized hydraulic fluid for use by one or more hydraulic systems of the aircraft 100.

The left and right wings 104, 106 may have one or more control surfaces such as high lift devices (e.g., auxiliary airfoils) that are located along the trailing edges of the left and right wings 104, 106. Such high lift devices may be displaced or extended from the trailing edges of the left and right wings 104, 106 to change the aerodynamic lift of the aircraft 100 and are typically used during takeoff and landing. For example, in FIG. 1, the aircraft 100 includes an outboard left flap 112 (a first flap) and an inboard left flap 114 coupled to the left wing 104, and an inboard right flap 116 (a third flap) and an outboard right flap 118 (a fourth flap) coupled to the right wing 106. The flaps 112-118 can be moved relative to the trailing edges of the left and right wings 104, 106 to change the shape of the left and right wings 104, 106 and generate more or less lift. Each of the flaps 112-118 is controlled via one or more flap actuators, as disclosed in further detail herein. While in this example the left and right wings 104, 106 each include two flaps, in other examples, the left and right wings 104, 106 can include more or fewer flaps (e.g., one flap, three flaps, four flaps, etc.).

Each of the flaps 112-118 is movable between a stowed position and a deployed position (sometimes referred to as a retracted position and an extended position, respectively). In the stowed position, the flaps 112-118 are generally aligned with the respective left and right wings 104, 106, as shown in FIG. 1. During cruise, for example, the flaps 112-118 are typically held in the stowed position, which is more aerodynamic and fuel efficient. In the deployed position, the flaps 112-118 are tilted and/or otherwise moved downward relative to the trailing edges of the left and right wings 104, 106. For example, during takeoff and/or landing, the flaps 112-118 can be deployed, which increases the chord length of the left and right wings 104, 106 to generate more lift. The aircraft 100 includes a cockpit 120 with controls that the pilot(s) can use to control the flaps 112-118. The flaps 112-118 can also be moved to any position between the stowed position and the deployed position (e.g., one or more deployed positions between the stowed position and a fully or maximum deployed position).

Figure 2A:
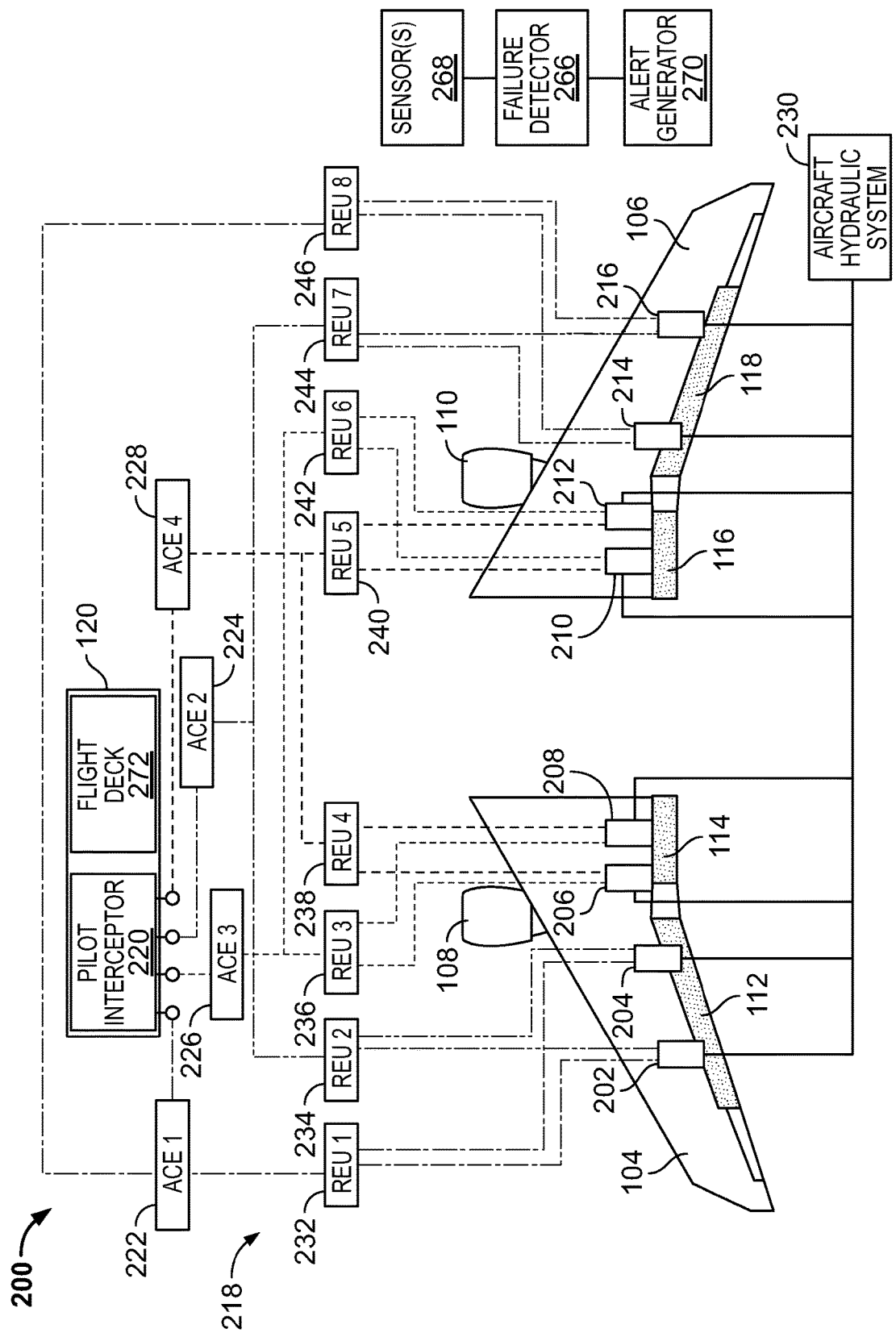
FIG. 2A is a schematic diagram of an example distributed trailing edge (DTE) actuation system including an example DTE control system.

FIG. 2A illustrates an example distributed trailing edge (DTE) actuation system 200 constructed in accordance with the teachings of this disclosure. The example DTE actuation system 200 is implemented in connection with the aircraft 100 (FIG. 1) for controlling movement (e.g., extending or retracting) of the flaps 112-118. The DTE actuation system 200 is also referred to herein as the system 200. As disclosed above, each of the flaps 112-118 is movable between a stowed position and a deployed position, which affects the lift of the left and right wings 104, 106. The system 200 includes one or more flap actuators for moving the respective flaps 112-118. In particular, as shown in FIG. 2A, the system 200 includes a first flap actuator 202, a second flap actuator 204, a third flap actuator 206, a fourth flap actuator 208, a fifth flap actuator 210, a sixth flap actuator 212, a seventh flap actuator 214, and an eighth flap actuator 216. In some examples, the flap actuators 202-216 are rotary actuators (which may be referred to herein as rotary flap actuators). In this example, each of the flaps 112-118 is controlled by two of the flap actuators 202-216. The first and second flap actuators 202, 204 are outboard and inboard flap actuators coupled to the left wing 104 for controlling movement of the outboard left flap 112. The third and fourth flap actuators 206, 208 are outboard and inboard flap actuators coupled to the left wing 104 for controlling movement of the inboard left flap 114. The fifth and sixth flap actuators 210, 212 are inboard and outboard flap actuators coupled to the right wing 106 for controlling movement of the inboard right flap 116. The seventh and eighth flap actuators 214, 216 are inboard and outboard flap actuators coupled to the right wing 106 for controlling movement of the outboard right flap 118. The flap actuators 202-216 can be operated in pairs to move the respective flaps 112-118. For example, the first and second flap actuators 202, 204 can be activated in unison to move the outboard left flap 112 between the stowed position and the deployed position. The flap actuators 202-216 can be operated to move the respective flaps 112-118 independently of each other or simultaneously. At cruise, the aircraft performance is enhanced by independently positioning the inboard and outboard flaps. Thus, examples disclosed herein enable the TEVC (Trailing Edge Variable Camber) function. While in this example the system 200 includes eight flap actuators, in other examples, the system 200 can include more or fewer flap actuators. Further, each of the flaps 112-118 can be activated by more or fewer flap actuators (e.g., one flap actuator, three flap actuators, etc.).

In the illustrated example, the system 200 includes a DTE control system 218 for controlling the flap actuators 202-216. Unlike known systems that utilize a series of torque tubes to activate all of the actuators simultaneously, the DTE control system 218 can independently control each of the flap actuators 202-216. In other words, each of the flap actuators 202-216 can be operated independently of the other flap actuators. The DTE control system 218 controls the flap actuators 202-218 based on commands from a pilot inceptor 220 (e.g., a flap lever) located in the cockpit 120. The DTE control system 218 determines the position of the pilot inceptor 220 and activates the flap actuators 202-216 accordingly. This type of system is considered a fly-by-wire control system.

In the example system 200, each of the flap actuators 202-216 is a hybrid hydraulic-electric actuator that includes a hydraulic powered actuator and an electric powered actuator (which may also be referred to as a hydraulic actuator portion and an electric actuator portion, respectively). The DTE control system 218 can operate the flap actuators 202-216 in different modes. In this example, the DTE control system 218 can operate the flap actuators 202-216 in a first mode, referred to herein as a normal mode or hydraulic powered mode, a second mode, referred to herein as an alternate mode or electric powered mode, and a third mode, referred to herein as a hybrid mode. In the hydraulic powered mode, the DTE control system 218 controls each of the flap actuators 202-216 using hydraulic power to operate their hydraulic powered actuators. In the electric powered mode, the DTE control system 218 controls each of the flap actuators 202-216 using electrical power to operate their electric powered actuators. In the hybrid mode, the DTE control system 218 controls the flap actuators 202-216 using a combination of both their hydraulic powered actuators and their electric powered actuators. An example of a hydraulic-electric actuator is disclosed in further detail herein in connection with FIGS. 4A-4C and 5.

Figure 4A:
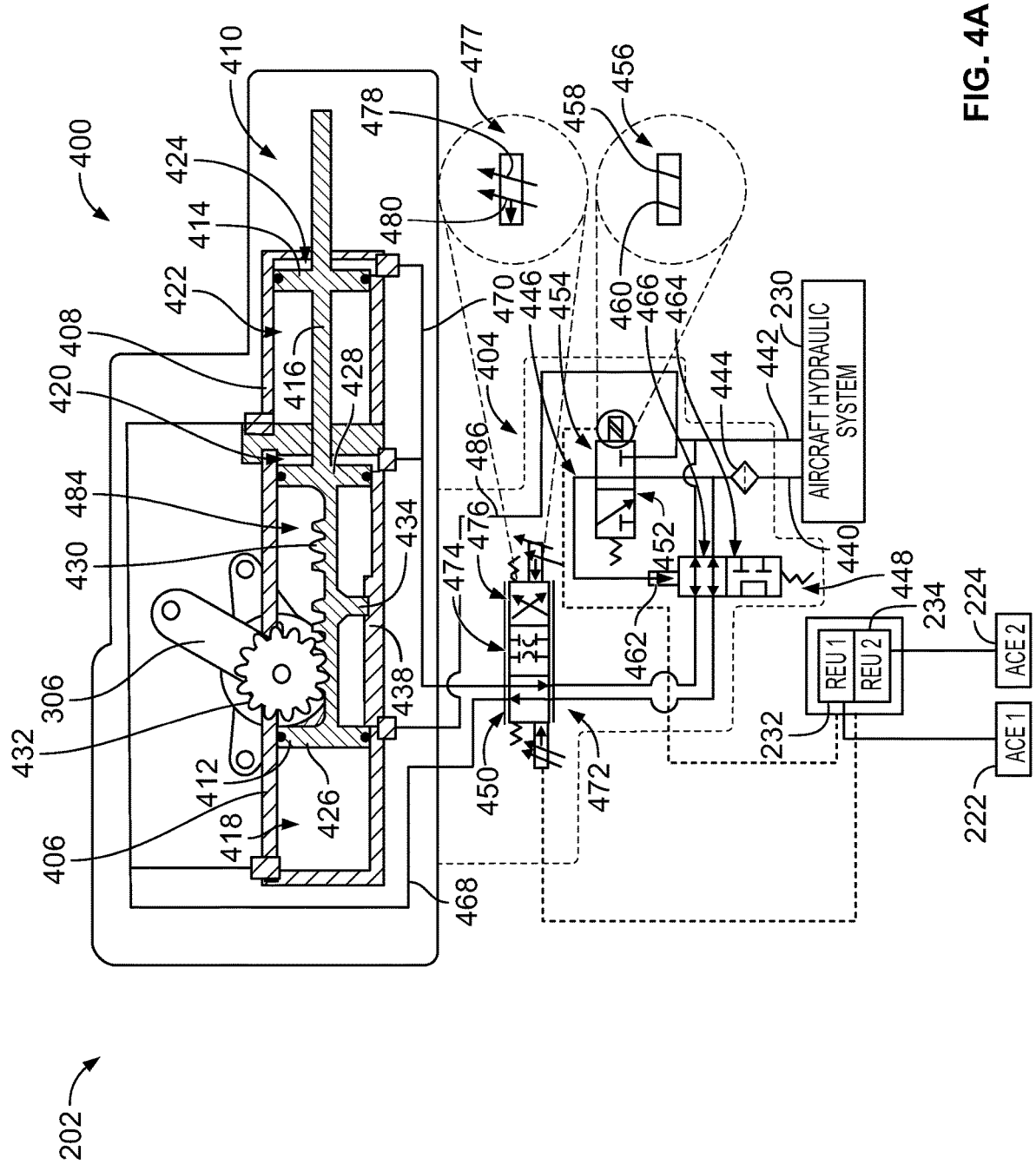
FIG. 4A illustrates an example flap actuator of the example DTE actuation system of FIGS. 2A and 2B.
Figure 4B:
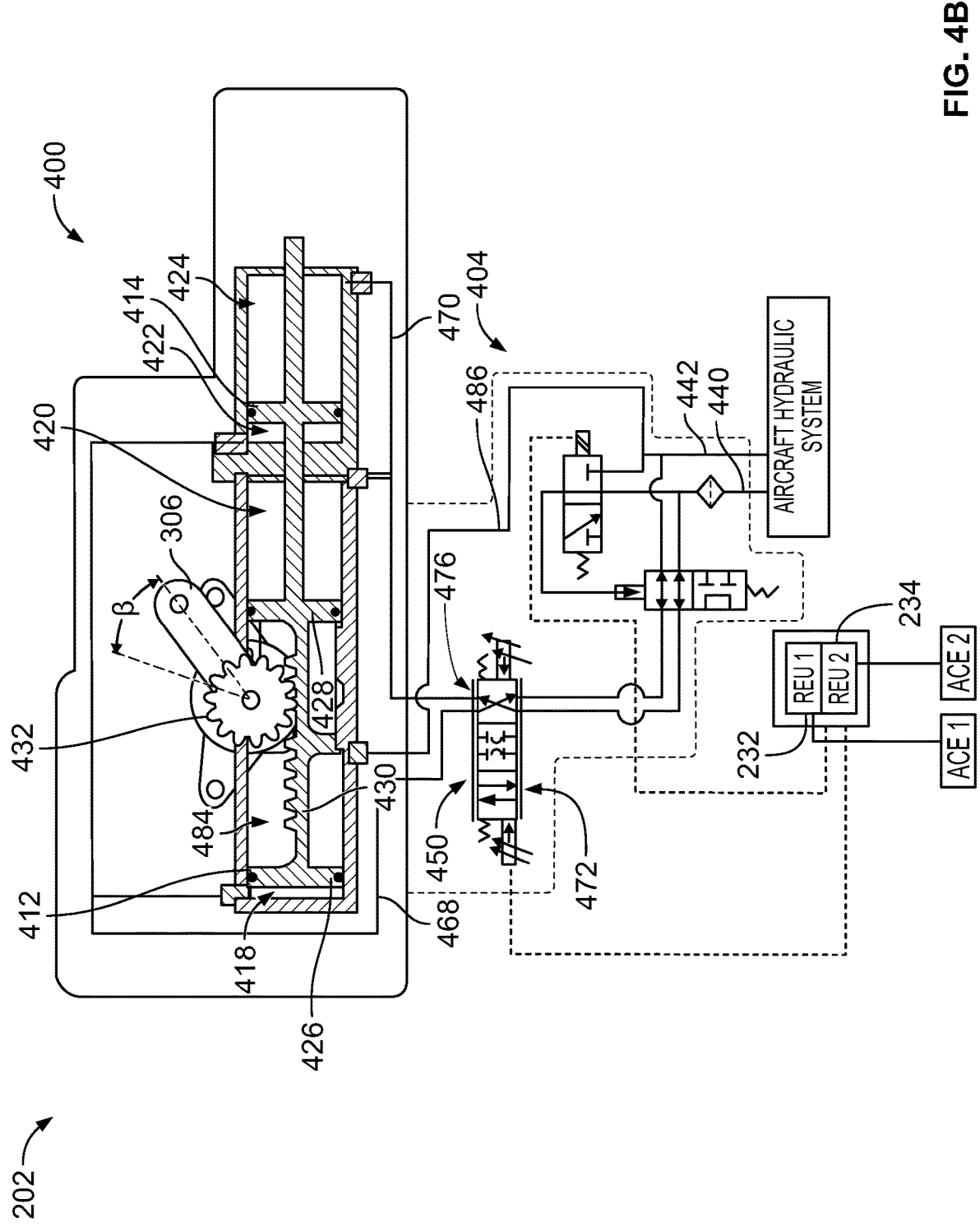
FIG. 4B shows the example valve of the example hydraulic control module of FIG. 4A in a second state in which pressurized hydraulic fluid is supplied to the example hydraulic powered actuator to move the example crank arm in a second direction.
Figure 4C:
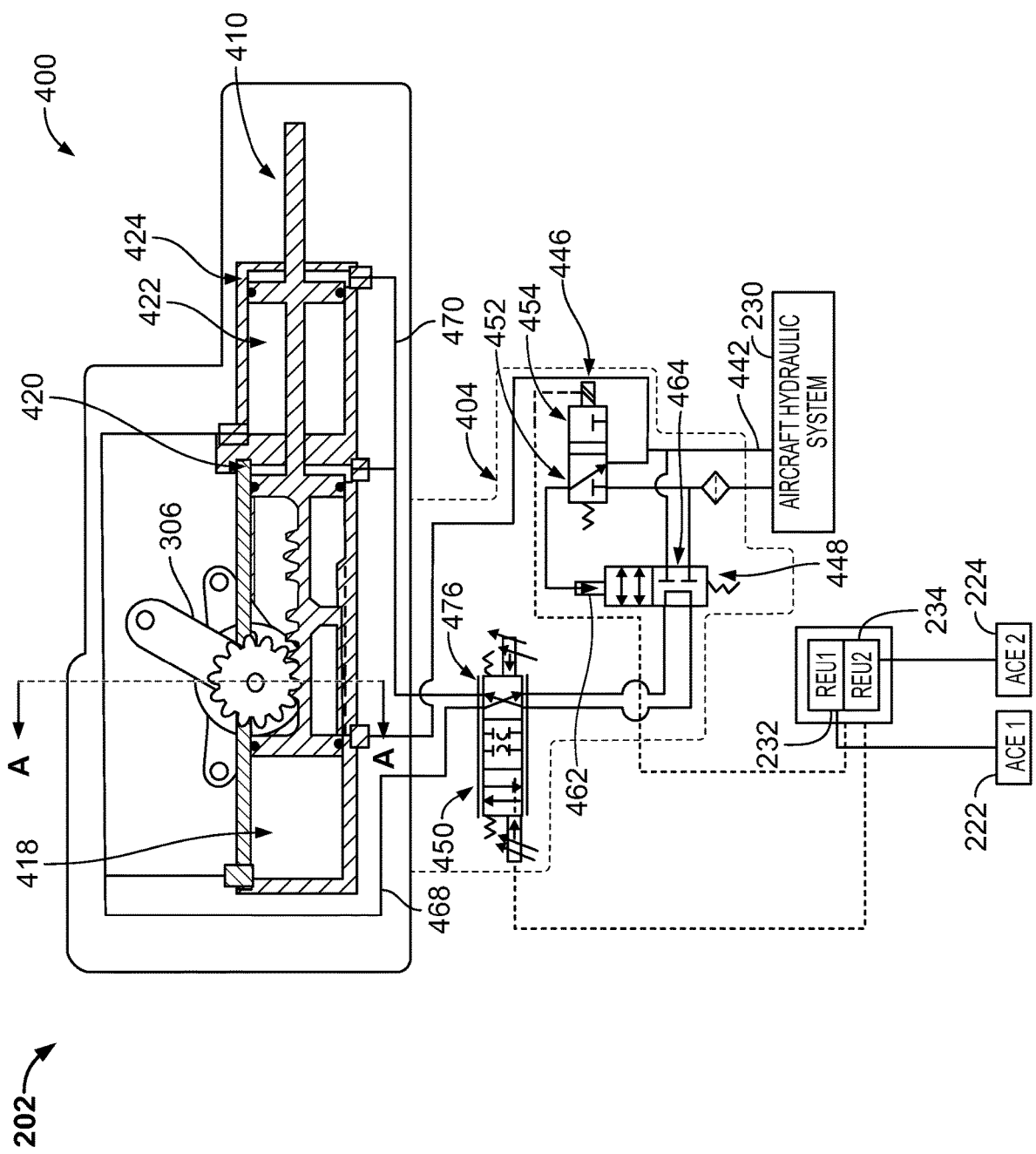
FIG. 4C shows the example hydraulic powered actuator of FIGS. 4A and 4B in a bypass mode.

In the illustrated example, the DTE control system 218 includes actuator control electronics (ACEs) for controlling the flap actuators 202-216 in their hydraulic powered mode, electric powered mode, and hybrid mode. In this example, the DTE control system 218 includes a first ACE 222, a second ACE 224, a third ACE 226, and a fourth ACE 228. The ACEs 222-228 control the hydraulic powered actuators and electric powered actuators of certain ones of the flap actuators 202-216, as disclosed in further detail herein. The ACEs 222-228 provide redundant control of the flap actuators 202-216. The ACEs 222-228 detect a position of the pilot inceptor 220 and command remote electronics units (REUs) (an example of which is shown in FIGS. 4A, 4B and 4C) and/or electric motor control units (EMCUs) (an example operation of which is disclosed in connection with FIG. 8) for controlling the flap actuators 202-216 based on the detected position. For example, if a pilot moves the pilot inceptor 220 to a position corresponding to a 15° deployment, the ACEs 222-228 activate the flap actuators 202-216 to move the flaps 212-218 to their 15° position.

Figure 2B:
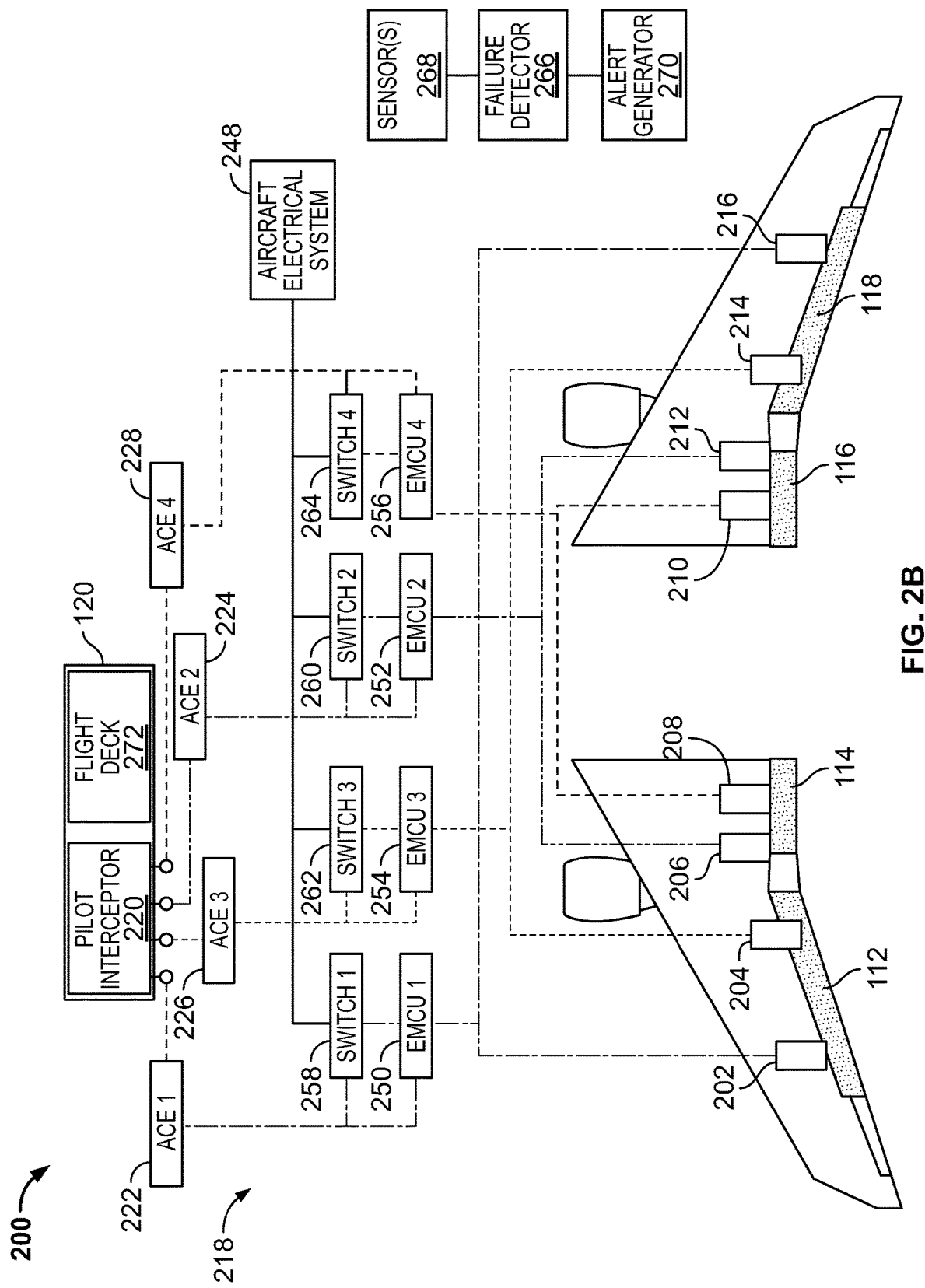
FIG. 2B is schematic diagram of the example DTE actuation system of FIG. 2A showing example components of the DTE control system for electrically controlling the one or more flap actuators of the aircraft of FIG. 1.

FIG. 2A shows the components of the DTE control system 218 for controlling the flap actuators 202-216 using hydraulic power, and FIG. 2B shows the components of the DTE control system 218 for controlling the flap actuators 202-216 using electrical power. Referring first to FIG. 2A, the aircraft 100 (FIG. 1) includes an aircraft hydraulic system 230. The aircraft hydraulic system 230 provides pressurized hydraulic fluid to various systems of the aircraft 100. The aircraft hydraulic system 230 can include one or more pumps driven by each of the engines 108, 110 (FIG. 1). The aircraft hydraulic system 230 is fluidly connected (e.g., via hydraulic lines or tubes) to each of the hydraulic powered actuators of the flap actuators 202-216. The DTE control system 218 can control the hydraulic powered actuators of the flap actuators 202-216 by controlling the flow of pressurized hydraulic fluid into and out of the hydraulic powered actuators. In the illustrated example, each of the hydraulic powered actuators of the flap actuators 202-216 is controllable by one of two remote electronics units that are controlled by the ACEs 222-228.

In the illustrated example, the DTE control system 218 includes remote electronics units (REUs). In the hydraulic powered mode and the hybrid mode, the REUs can control the hydraulic powered actuators of the flap actuators 202-216 to move the respective flaps 112-118. In particular, the REUs receive commands from the ACEs 222-228 and convert the commands into control signals for activating the hydraulic powered actuators of the flap actuators 202-216. In the illustrated example, the DTE control system 218 includes a first REU 232, a second REU 234, a third REU 236, a fourth REU 238, a fifth REU 240, a sixth REU 242, a seventh REU 244, and an eighth REU 246. The first REU 232 and the eighth REU 246 are controlled by the first ACE 222. The first REU 232 controls the hydraulic powered actuators of the first and second flap actuators 202, 204 based on commands from the first ACE 222, and the eighth REU 246 controls the hydraulic powered actuators of the seventh and eighth flap actuators 214, 216 based on commands from the first ACE 222. The second REU 234 and the seventh REU 244 are controlled by the second ACE 224. The second REU 234 controls the hydraulic powered actuators of the first and second flap actuators 202, 204 based on commands from the second ACE 224, and the seventh REU 244 controls the hydraulic powered actuators of the seventh and eighth flap actuators 214, 216 based on commands from the second ACE 224. Thus, the first and second ACEs 222, 224 are redundant, the first and second REUs 232, 234 are redundant, and the seventh and eighth REUs 244, 246 are redundant. If one of the first or second ACEs 222, 224 and/or their associated REUs 232, 234, 244, 246 fails and/or otherwise becomes inoperable, the other ACE and its REUs can continue to operate the first, second, seventh, and eighth flap actuators 202, 204, 214, 216 to move the outboard left and right flaps 112, 118. For example, the first REU 232 or the second REU 234 can control the hydraulic powered actuator of the first flap actuator 202 (based on commands from the first and second ACEs 222, 224, respectively). If one of these two REUs fails and/or otherwise becomes inoperable, the other REU can control the hydraulic powered actuator of the first flap actuator 202. The first REU 232 or the second REU 234 can also control the hydraulic powered actuator of the second flap actuator 204 (based on commands from the first and second ACEs 222, 224, respectively). Similarly, the seventh REU 244 or the eighth REU 246 can control the hydraulic powered actuator of the seventh flap actuator 214 (based on commands from the second and first ACEs 224, 222, respectively). If one of these two REUs fails and/or otherwise becomes inoperable, the other REU can control the hydraulic powered actuator of the seventh flap actuator 214. The seventh REU 244 or the eighth REU 246 can also control the hydraulic powered actuator of the eighth flap actuator 216 (based on commands from the second and first ACEs 224, 222, respectively). Therefore, the hydraulic powered actuator in DTE control system 218 is controlled by redundancy channels such that if one of the two REU fails, the remaining REU (channel) can still control hydraulic powered actuator of the flap actuator.

Similarly, the third and fourth ACEs 226, 228 control the hydraulic powered actuators of the third, fourth, fifth, and sixth flap actuators 206-212 in a redundant fashion. The third REU 236 and the sixth REU 242 are controlled by the third ACE 226. The third REU 236 controls the hydraulic powered actuators of the third and fourth flap actuators 206, 208 based on commands from the third ACE 226, and the sixth REU 242 controls the hydraulic powered actuators of the fifth and sixth flap actuators 210, 212 based on commands from the third ACE 226. The fourth REU 238 and the fifth REU 240 are controlled by the fourth ACE 228. The fourth REU 238 controls the hydraulic powered actuators of the third and fourth flap actuators 206, 208 based on commands from the fourth ACE 228, and the fifth REU 240 controls the hydraulic powered actuators of the fifth and sixth flap actuators 210, 212 based on commands from the fourth ACE 228. Thus, the third and fourth ACEs 226, 228 are redundant, the third and fourth REUs 236, 238 are redundant, and the fifth and sixth REUs 240, 242 are redundant. If one of the third or fourth ACEs 226, 228 and/or their associated REUs 236-242 fails and/or otherwise becomes inoperable, the other ACE and its REUs can continue to operate the third, fourth, fifth, and sixth flap actuators 206-212. For example, the third REU 236 or the fourth REU 238 can control the hydraulic powered actuator of the third flap actuator 206 (based on commands from the third and fourth ACEs 226, 228, respectively). If one of these two REUs fails and/or otherwise becomes inoperable, the other REU can control the hydraulic powered actuator of the third flap actuator 236. The third REU 236 or the fourth REU 238 can also control the hydraulic powered actuator of the fourth flap actuator 208 (based on commands from the third and fourth ACEs 226, 228, respectively). Similarly, the fifth REU 240 or the sixth REU 242 can control the hydraulic powered actuator of the fifth flap actuator 210 (based on commands from the fourth and third ACEs 228, 226, respectively). If one of these two REUs fails and/or otherwise becomes inoperable, the other REU can control the hydraulic powered actuator of the fifth flap actuator 210. The fifth REU 240 or the sixth REU 242 can also control the hydraulic powered actuator of the sixth flap actuator 212 (based on commands from the fourth and third ACEs 228, 226, respectively). Therefore, the hydraulic powered actuator in DTE control system 218 is controlled by redundancy channels such that if one of the two REU fails, the remaining REU (channel) can still control hydraulic powered actuator of the flap actuator.

Turning to FIG. 2B, the DTE control system 218 can also control the electric powered actuators of the flap actuators 202-216 to move the flaps 112-118. In particular, in the electric powered mode or the hybrid mode, the ACEs 222-228 control the electric powered actuators of certain ones of the flaps actuators 202-216 to move the respective flaps 112-118.

As shown in FIG. 2B, the aircraft 100 (FIG. 1) includes an aircraft electrical system 248. The ACEs 222-228 control the supply of electrical power to the electric powered actuators of the flap actuators 202-216. In particular, the ACEs 222-228 receive pilot inceptor position and command one or more electric motor control units (disclosed in further detail herein) based on the received pilot inceptor position. The electric motor control units control the electric powered actuators to actuate the respective flap actuators 202-216. In this manner, the ACEs 222-228 control the electric powered actuators in the electric powered mode and the hybrid mode. In the illustrated example, the first ACE 222 controls the electric powered actuators of the first and eighth flap actuators 202, 216, the second ACE 224 controls the electric powered actuators of the third and sixth flap actuators 206, 212, the third ACE 226 control the electric powered actuators of the second and seventh flap actuators 204, 214, and the fourth ACE 228 controls the electric powered actuators of the fourth and fifth flap actuators 208, 210. Therefore, at least one of the electric powered actuators of the flap actuators 202, 204, 214, 216 associated with the outboard left and right flaps 112, 118 is controlled by the second ACE 224, and at least one of the electric powered actuators of the flap actuators 206-212 associated with the inboard left and right flaps 114, 116 is controlled by the third ACE 226.

In the illustrated example, the DTE control system 218 includes electric motor control units (EMCUs). Each of the EMCUs controls one or more of the electric powered actuators of the flap actuators 202-216, and each of the EMCUs is controlled by an ACE. The EMCUs receive commands from the ACEs 222-228 and convert the commands into control signals for activating the electric powered actuators of the flap actuators 202-216. In the illustrated example, the DTE control system 218 includes a first EMCU 250, a second EMCU 252, a third EMCU 254, and a fourth EMCU 256. The first EMCU 250 controls the electric powered actuators of the first and eighth flap actuators 202, 216 based on commands from the first ACE 222. The second EMCU 252 controls the electric powered actuators of the third and sixth flap actuators 206, 212 based on commands from the second ACE 224. The third EMCU 254 controls the electric powered actuators of the second and seventh flap actuators 204, 214 based on commands from the third ACE 226. The fourth EMCU 256 controls the electric powered actuators of the fourth and fifth flap actuators 208, 210 based on commands from the fourth ACE 228.

In the illustrated example, the DTE control system 218 includes a first switch 258 that is electrically coupled between the aircraft electrical system 248 and the first EMCU 250. The first switch 258 is controlled by the first ACE 222. To operate the electric powered actuators of the first and eighth flap actuators 202, 216 (e.g., in the electric powered mode and/or the hybrid mode), the first ACE 222 activates the first switch 258 (e.g., to create a closed circuit), which enables the supply of electrical power from the aircraft electrical system 248 to the first EMCU 250. The first EMCU 250 then activates the electric powered actuators of the first and eighth flap actuators 202, 216 (e.g., by controlling the supply of electrical power to the electric powered actuators) based on commands from the first ACE 222. Similarly, the DTE control system 218 includes a second switch 260 between the aircraft electrical system 248 and the second EMCU 252, a third switch 262 between the aircraft electrical system 248 and the third EMCU 254, and a fourth switch 264 between the aircraft electrical system 248 and the fourth EMCU 256. The second, third, and fourth switches 260, 262, 264 are similarly controlled by the respective second, third, and fourth ACEs 224-228.

As shown in FIGS. 2A and 2B, the DTE control system includes a failure detector 266. In some examples, the failure detector 266 determines whether there has been a failure or loss of normal functionality in one or more systems or components of the system 200 and/or other systems or components of the aircraft 100 (FIG. 1). In some examples, the failure detector 266 determines whether there has been a failure based on input from one or more sensor(s) 268. The sensor(s) 268 can be operatively coupled and/or associated with various components and/or systems. For example, the sensor(s) 268 can include sensors in the flap actuators 202-216 for detecting failure of the flap actuators 202-216, a sensor in the aircraft hydraulic system 230 for detecting failure of loss of hydraulic power, etc. Based on whether there has been a failure, and/or what type of failure, the ACEs 222-228 can switch between operating the flap actuators 202-216 in the hydraulic powered mode, the electric powered mode, and the hybrid mode.

As shown in FIGS. 2A and 2B, the DTE control system 218 includes an alert generator 270. In some examples, the alert generator 270 generates an alert in a flight deck 272 (e.g., a screen or monitor, a control panel, etc.) in the cockpit 120 to indicate to the pilot that certain ones of the flaps 112-118 are inoperable. The pilot can then operate the aircraft 100 according to a non-normal procedure to compensate for the lack of certain ones of the flaps 112-118. For example, if one or more of the flap actuators associated with the outboard left and right flaps 112, 118 are inoperable, the DTE control system 218 may disable the flap actuators 202, 204, 214, 216 associated with the outboard left and right flaps 112, 118, and lock the outboard left and right flaps 112, 118 in place (e.g., via no-backs). In such an instance, the flap actuators 206-212 may still be used to move the inboard left and right flaps 114, 116. Therefore, the pilot can still use the inboard left and right flaps 114, 116 to control the aircraft 100 (FIG. 1).

Figure 14:
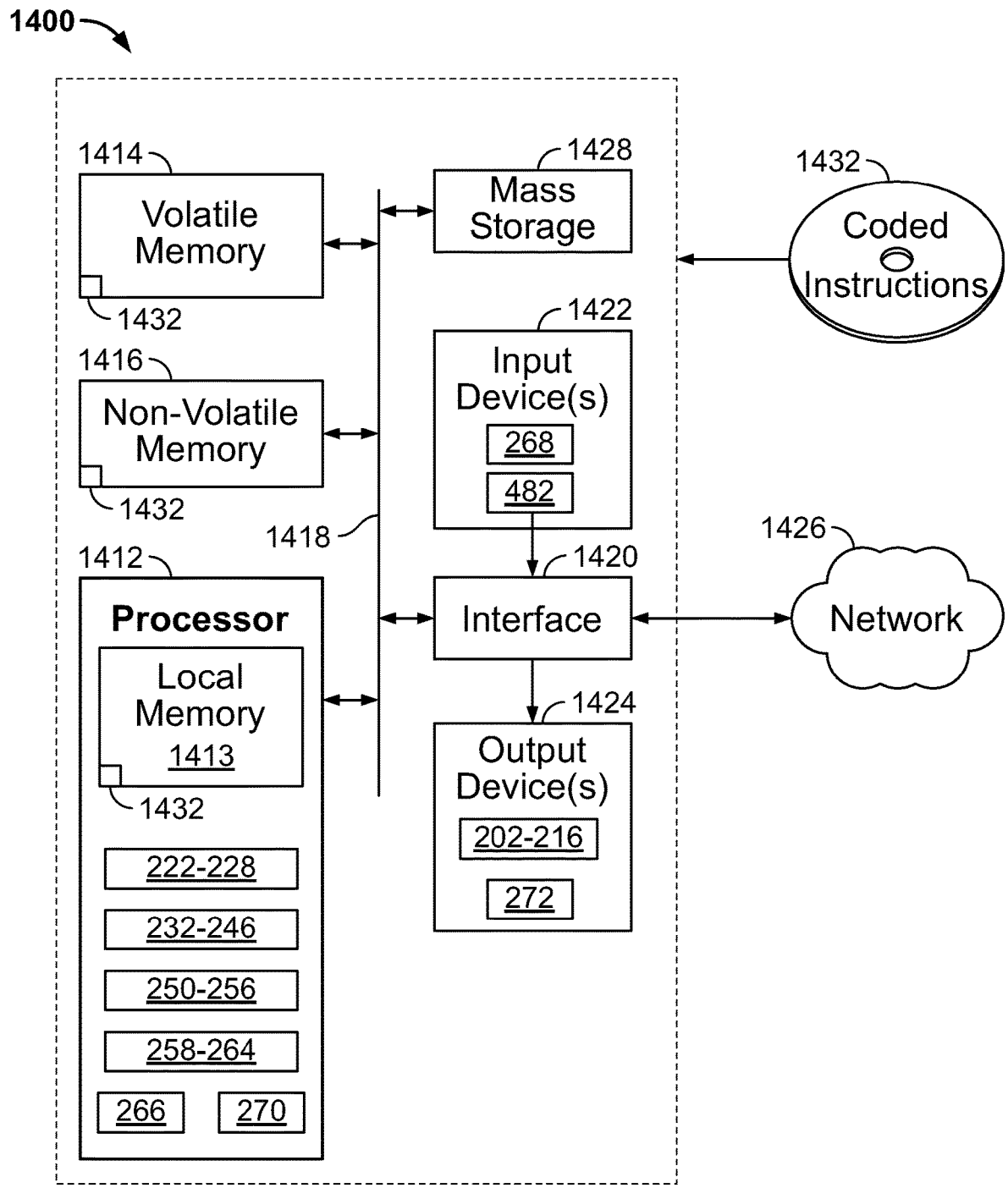
FIG. 14 is a block diagram of an example processing platform structured to execute the instructions of FIGS. 6-11 to implement the example DTE control system of FIGS. 2A and 2B.

The ACEs 222-228, the REUs 232-246, the EMCUs 250-256, the switches 258-264, the failure detector 266, and/or the alert generator 270, can be implemented by separate devices or implemented in combination by one or more devices, such as the processor 1412 disclosed in connection with FIG. 14. Before describing the types of failures and modes of operation, a description of the flap actuators and actuator linkage assemblies is described in connection with FIGS. 3A, 3B, 4A-4C, and 5.

Figure 3A:
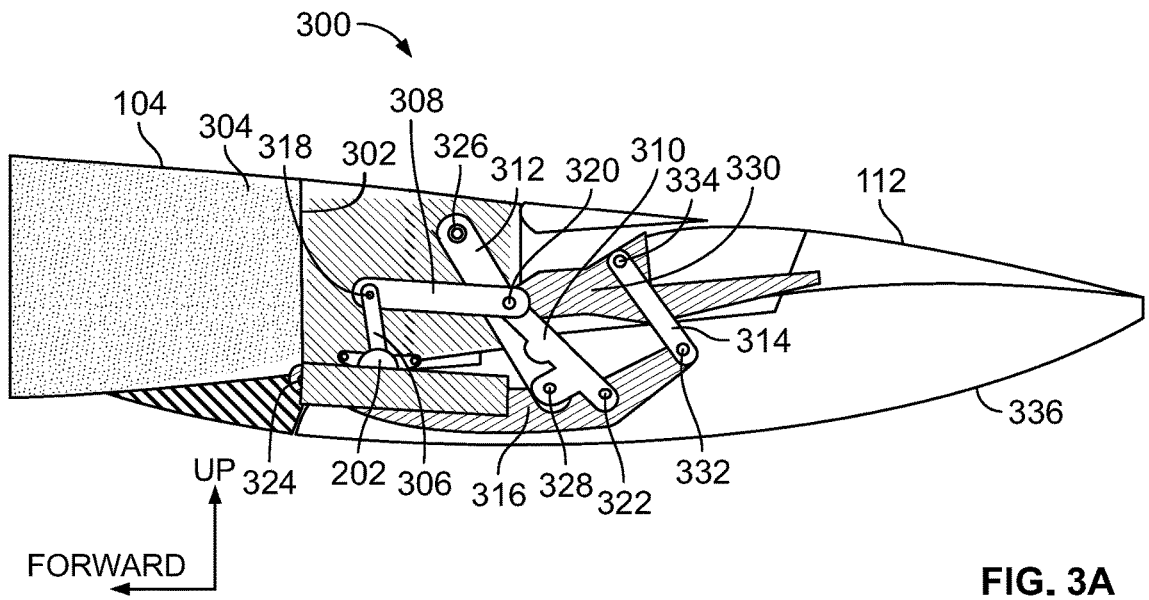
FIG. 3A is a side view of an example flap actuator of the example DTE actuation system of FIG. 2A and an example linkage system used to move an example flap.
Figure 3B:
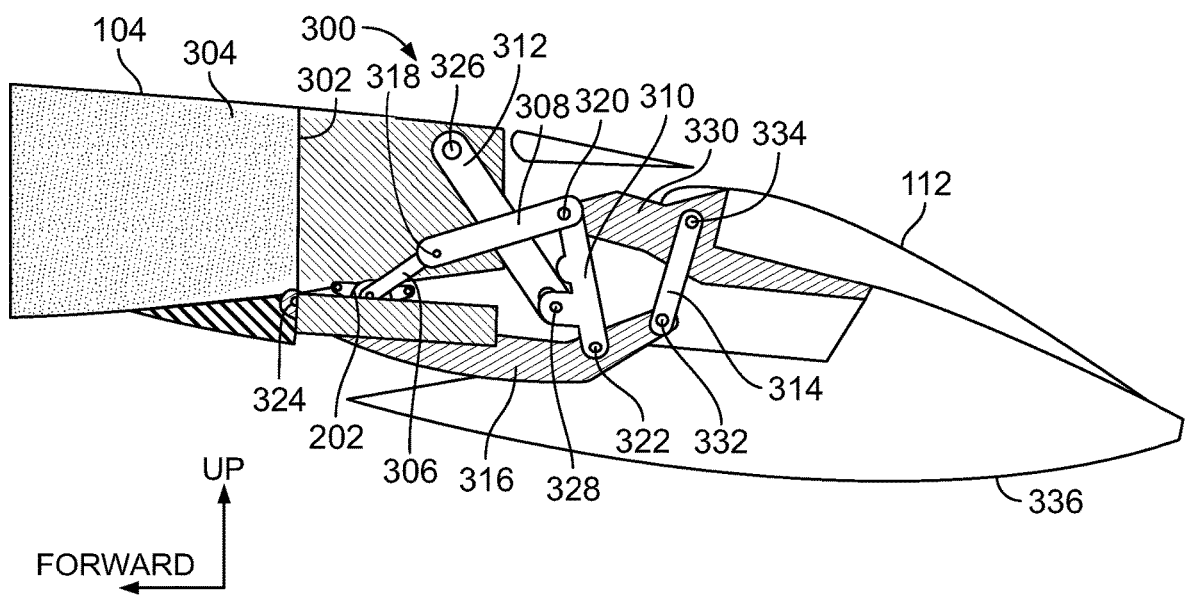
FIG. 3B is a side view of the example flap actuator, example linkage assembly, and example flap of FIG. 3A showing the example flap in a deployed position.

FIGS. 3A and 3B are cross-sectional views of the left wing 104 showing the first flap actuator 202 and an example linkage assembly 300 associated with the first flap actuator 202 for moving the outboard left flap 112. FIG. 3A shows the outboard left flap 112 in the stowed position and FIG. 3B shows the outboard flap in the deployed position. The first flap actuator 202 can be activated to move the outboard left flap 112 between the stowed position and the deployed position via the linkage assembly 300. Each of the other flap actuators 204-216 (FIGS. 2A and 2B) includes a similar linkage assembly and operates in a similar manner. To avoid redundancy, the linkage assembly 300 is only described in connection with the first flap actuator 202 of the outboard left flap 112. However, it is understood that other flap actuators 204-216 can include similar linkage assemblies for moving the respective flaps in a similar manner.

In the illustrated example, the first flap actuator 202 is coupled to the left wing 104. For example, the first flap actuator 202 can be coupled to a support beam in the left wing 104, such as a rear spar 302 and/or a rib 304 in the left wing 104. In other examples, the first flap actuator 202 can be coupled to another structure in the left wing 104.

In this example, the first flap actuator 202 is a rotary actuator. As shown in FIGS. 3A and 3B, the first flap actuator 202 includes a crank arm 306, sometimes referred to as an output arm. The crank arm 306 is rotatable about an axis (e.g., an axis 502 shown in FIG. 5). The first flap actuator 202 can be activated to rotate the crank arm 306. In particular, the first flap actuator 202 can be activated to rotate the crank arm 306 in a first direction (the clockwise direction in FIGS. 3A and 3B) to move the outboard left flap 112 from the stowed position to the deployed position, or activated to rotate the crank arm 306 in a second direction (the counter-clockwise direction in FIGS. 3A and 3B) to move the outboard left flap 112 from the deployed position to the stowed position. The crank arm 306 can be driven by the hydraulic powered actuator and/or the electric powered actuator of the first flap actuator 202. Examples of the hydraulic powered actuator and the electric powered actuator are disclosed in further detail in connection with FIGS. 4A-4C and 5.

The crank arm 306 is coupled to the outboard left flap 112 via the linkage assembly 300. The linkage assembly 300 includes a plurality of links (which may be referred to as arms, rods, cranks, etc.) that couple the crank arm 306 to the outboard left flap 112 such that movement of the crank arm 306 causes movement of the outboard left flap 112. In the illustrated example, the linkage assembly 300 includes a push rod 308, a first crank 310, a second crank 312, a third crank 314, and a support arm 316. In the illustrated example, the push rod 308 is coupled between the crank arm 306 and the first crank 310. In particular, one end of the push rod 308 is pivotably coupled to the crank arm 306 at a first pivot 318, and the opposite end of the push rod 308 is pivotably coupled to an end of the first crank 310 and a flap horn arm 330 at a second pivot 320.

As shown in FIGS. 3A and 3B, the first crank 310 is pivotably coupled to the support arm 316 at a third pivot 322. The support arm 316 is pivotably coupled to the left wing 104 at a fourth pivot 324. The support arm 316 extends aft from the left wing 104. The second crank 312 is coupled between the left wing 104 and the first crank 310. In particular, one end of the second crank 312 is pivotably coupled to the left wing 104 at a fifth pivot 326, and the opposite end of the second crank 312 is pivotably coupled to the first crank 310 at a sixth pivot 328. The sixth pivot 328 is between the second and third pivots 320, 322. The push rod 308 and the first crank 310 are also pivotably coupled at the second pivot 320 to the flap horn arm 330 of the outboard left flap 112.

In the illustrated example, the third crank 314 is coupled between an end of the support arm 316 and the flap horn arm 330 on the outboard left flap 112. In particular, one end of the third crank 314 is pivotably coupled to the support arm 316 at a seventh pivot 332, and the opposite end of the third crank 314 is pivotably coupled to the flap horn arm 330 at an eighth pivot 334.

To move the outboard left flap 112 from the stowed position in FIG. 3A to the deployed position in FIG. 3B, for example, the first flap actuator 202 is activated to rotate the crank arm 306 in the clockwise direction in FIGS. 3A and 3B. As the crank arm 306 rotates, the crank arm 306 pushes the push rod 308 to the right in FIGS. 3A and 3B. This causes the first crank 310 to pivot about the third pivot 322 in the clockwise direction of FIGS. 3A and 3B. The second crank 312 pivots about the fifth pivot 326 in the counter-clockwise direction in FIGS. 3A and 3B. The first crank 310 pushes the support arm 316 downward, such that the support arm 316 pivots about the fourth pivot 324. The push rod 308 also pushes the flap horn arm 330 to the right in FIGS. 3A and 3B and, thus, moves the outboard left flap 112 downward, as shown in FIG. 3B.

The first flap actuator 202 can be stopped or deactivated when the outboard left flap 112 reaches the deployed position. The first flap actuator 202 can be activated to rotate the crank arm 306 in the opposite direction (the counter-clockwise direction in FIGS. 3A and 3B) to move the outboard left flap 112 back to the stowed position. The first flap actuator 202 can be activated to move the outboard left flap 112 to any position between the stowed position shown in FIG. 3A and the deployed position shown in FIG. 3B.

In some examples, the linkage assembly 300 is disposed at least partially within a flap support fairing 336 coupled to and movable with the outboard left flap 112. The flap support fairing 336 provides an aerodynamic covering for the linkage assembly 300.

The example first flap actuator 202 and the example linkage assembly 300 are more compact than known actuators and linkage assemblies. Further, the example first flap actuator 202 and the example linkage assembly 300 do not require torque tubes or transmissions between the torque tubes along the rear spar 302 as in known assemblies. As a result, less space is utilized behind the rear spar 302. As such, the left wing 104 is be constructed thinner, which produces more efficient flight.

FIG. 4A is a partial cross-sectional view of the example first flap actuator 202 and a schematic diagram of associated control components. Each of the other flap actuators 204-216 (FIGS. 2A and 2B) is substantially the same as the first flap actuator 202. Therefore, any of the structures and/or functions disclosed in connection with the first flap actuator 202 can likewise apply to the other flap actuators 204-216.

As disclosed above, the first flap actuator 202 is a hydraulic-electric actuator. The first flap actuator 202 includes a hydraulic powered actuator 400 (which may also be referred to as a hydraulic actuator) shown in FIGS. 4A-4C and an electric powered actuator 500 (which may also be referred to as an electric actuator) shown in FIG. 5. As shown in FIGS. 4A-4C, the first flap actuator 202 includes a hydraulic control module (HCM) 404 to control the operation of the hydraulic powered actuator 400. The hydraulic powered actuator 400 (FIGS. 4A-4C) is coupled to the crank arm 306 and can be actuated to rotate the crank arm 306 to move the outboard left flap 112 (FIG. 1), and the electric powered actuator 500 (FIG. 5) is coupled to the crank arm 306 and can be activated to rotate the crank arm 306 to move the outboard left flap 112. The first flap actuator 202 is operable in the hydraulic (normal) powered mode in which the hydraulic powered actuator 400 is activated to move the outboard left flap 112, the electric (alternate) powered mode in which the electric powered actuator 500 is activated to move the outboard left flap 112, and the hybrid mode in which the hydraulic powered actuator 400 and the electric powered actuator 500 are activated simultaneously to move the outboard left flap 112.

Referring to FIG. 4A, the hydraulic powered actuator 400 includes a dual piston arrangement. In some examples, using such a dual tandem or multiple tandem pistons arrangement generates adequate output forces for moving the crank arm 306 and minimizes the actuator diameter. In the illustrated example, the hydraulic powered actuator 400 includes a first housing 406 (e.g., a cylinder) and a second housing 408 coupled to the first housing 406. The hydraulic powered actuator 400 includes an integrated piston and rack assembly 410 (referred to herein as the piston assembly 410). The piston assembly 410 includes a first piston 412 disposed in the first housing 406 and a second piston 414 disposed in the second housing 408. The piston assembly 410 also includes a piston rod 416 that couples the first and second pistons 412, 414 such that the first and second pistons 412, 414 move together (in tandem). As shown in FIG. 4A, the first piston 412 divides the first housing 406 into a first chamber 418 and a second chamber 420. Similarly, the second piston 414 divides the second housing 408 into a first chamber 422 and a second chamber 424. When there is higher pressure in the first chambers 418, 422, the first and second pistons 412, 414 are moved to the right in FIG. 4A, and when there is higher pressure in the second chambers 420, 424, the first and second pistons 412, 414 are moved to the left in FIG. 4A. In some examples, one or more seals are disposed between the first and second pistons 412, 414 and the respective housings 406, 408 to prevent leakage of hydraulic fluid between the chambers.

In the illustrated example, the first piston 412 includes a first sub-piston 426 and a second sub-piston 428 spaced apart from the first sub-piston 426. The hydraulic powered actuator 400 also includes a rack 430 with teeth. In the illustrated example, the rack 430 is part of the piston assembly 410 and coupled between the first sub-piston 426 and the second sub-piston 428. In other examples, the rack 430 can be disposed in another location (e.g., on the piston assembly 410 outside of the first and second housings 406, 408). In the illustrated example, the hydraulic powered actuator 400 includes a pinion gear 432. The pinion gear 432 is at least partially disposed in the first housing 406 and engaged (meshed) with the rack 430. The pinion gear 432 is coupled to the crank arm 306 such that linear movement of the rack 430 causes rotation of the pinion gear 432 and, thus, rotation of the crank arm 306. When the first piston 412 is moved to the right in FIG. 4A (e.g., by pressurizing the first chambers 418, 422), the crank arm 306 is rotated in the counter-clockwise direction, and when the first piston 412 is moved to the left in FIG. 4A (e.g., by pressurizing the second chambers 420, 424), the crank arm 306 is rotated in the clockwise direction. While in this example the hydraulic powered actuator 400 utilizes a dual piston arrangement, in other examples, the hydraulic powered actuator 400 may only include one piston (e.g., only the first housing 406 and the first piston 412).

Figure 5:
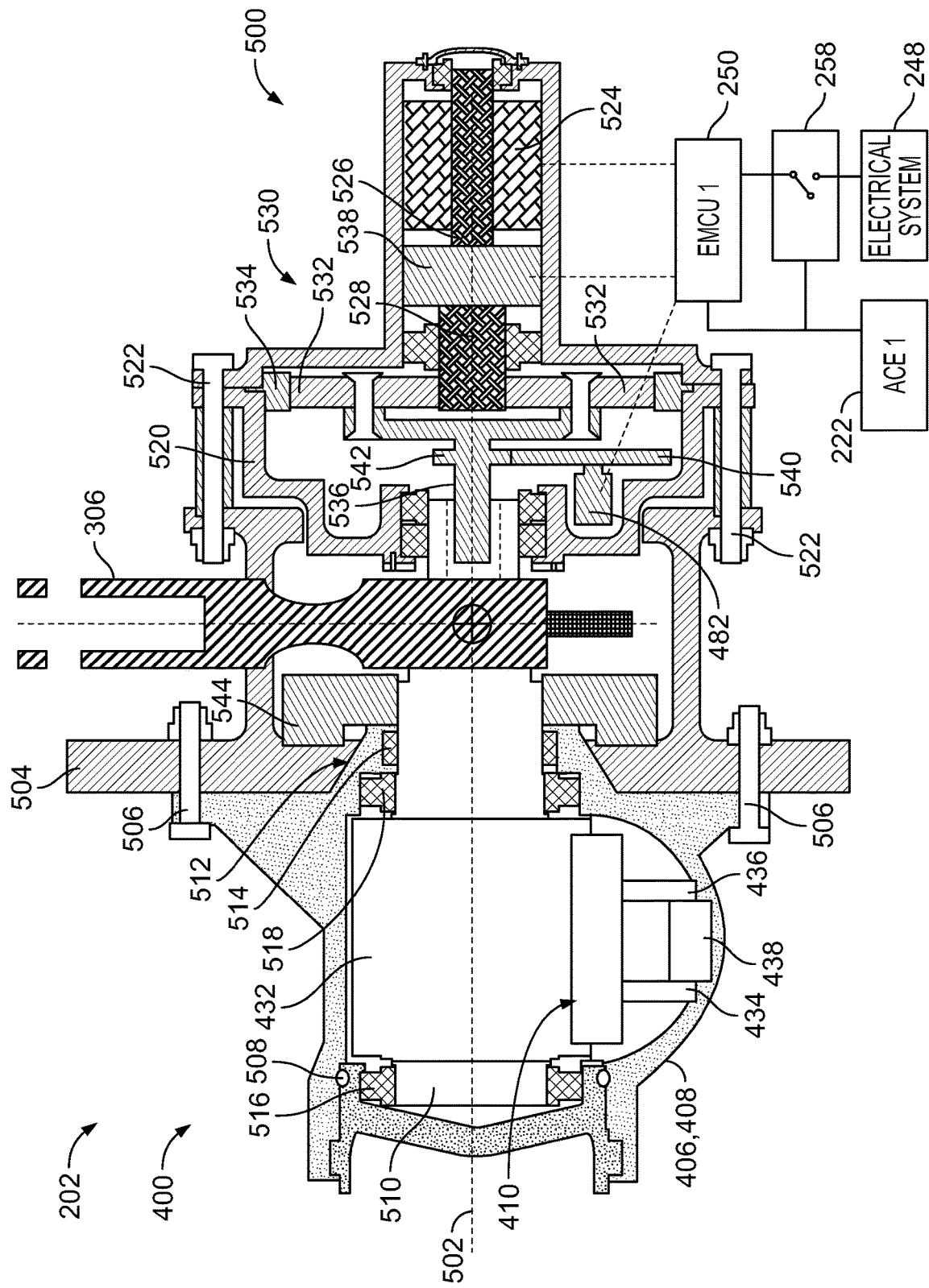
FIG. 5 is a cross-sectional view of the example flap actuator taken along line A-A of FIG. 4C.

In some examples, the piston assembly 410 includes an anti-rotation device to prevent the piston assembly 410 from rotating in the first and second housings 406, 408 to maintain engagement between the pinion gear 432 and the rack 430. For example, as shown in FIG. 4A, the piston assembly 410 includes first and second tabs 434, 436 (the second tab 436 is shown in FIG. 5). In this example, the first and second tabs 434, 436 extend from the rack 430 toward an inner wall of the first housing 406. The first and second tabs 434, 436 are disposed on opposite sides of a ridge 438 extending from an inner surface of the first housing 406. The first and second tabs 434, 436 slide or move along the ridge 438 as the piston assembly 410 moves. Should the piston assembly 410 start to rotate, one of the tabs 434, 436 engages the ridge 438 to prevent the piston assembly 410 from rotating. The anti-rotation feature prevents the rack teeth from disconnecting from the pinion teeth.

In the illustrated example, the hydraulic powered actuator 400 includes the HCM 404. The HCM 404 controls the flow of pressurized fluid into or out of the chambers 418-424 to control the movement of the first and second pistons 412, 414, and thereby control the movement of the crank arm 306. The HCM 404 is redundantly controlled by the first or the second REUs 232, 234. For example, in FIG. 2A, the first REU 232 has a primary role to control the first flap actuator 202. The second REU 234 has primary role is to control the second actuator 204. The first REU 232 has a secondary role to control the second flap actuator 204 when the second REU 234 fails. Similarly, the second REU 234 has a secondary role to control the first flap actuator 202 when the first REU 232 fails. This method allows airplane dispatch with one failed REU. The first ACE 222 sends commands to the first REU 232 to the first flap actuator 202. The first REU 232 interprets the commands and controls electrical components of the HCM 404 of the first flap actuator 202 (e.g., to achieve the commanded position). If the first REU 232 fails, the second REU 234 can interpret commands from the second ACE 224 and control the electrical components of the HCM 404 of the first flap actuator 202. Thus, the first and second ACEs 222, 224 and the first and second REUs 232, 234 provide redundant electrical control for the first flap actuator 202. The first and second ACEs 222, 224 and the first and second REUs 232, 234 similarly provide redundant electrical control for the second flap actuator 204.

As shown in FIG. 4A, the HCM 404 is fluidly coupled to the aircraft hydraulic system 230. In particular, the HCM 404 is fluidly coupled to a supply line 440 and a return line 442 of the aircraft hydraulic system 230. The supply line 440 provides high pressure hydraulic fluid from the aircraft hydraulic system 230, and the return line 442 returns low pressure hydraulic fluid to the aircraft hydraulic system 230. In some examples, as shown in FIG. 4A, the HCM 404 includes a fluid filter 444 coupled to the supply line 440 to filter particles, debris, and/or contaminants from the hydraulic fluid before entering the HCM 404. In some examples, the HCM 404 includes anti-cavitation valves to prevent aiding airloads from causing actuator cavitation during flap retraction.

In the illustrated example, the HCM 404 includes a first valve 446, a second valve 448, and a third valve 450. In this example, the first valve 446 is a Solenoid Operating Valve (SOV), referred to herein as the SOV 446, the second valve 448 is a Mode Selector Valve (MSV), referred to herein as the MSV 448, and the third valve 450 is an Electro-hydraulic Servo-valve (EHSV), referred to herein as the EHSV 450. As shown in FIG. 4A, the supply line 440 and the return line 442 are fluidly coupled to the first valve 446. The SOV 446 is controlled by the first REU 232. The SOV 446 is operable between a first state 452 and a second state 454, referred to herein as an OFF state 452 and an ON state 454 (sometimes referred to as valve positions, or ported positions). The SOV 446 is spring loaded to bias to the OFF state 452 (e.g., via a spring). As shown in the callout in FIG. 4A, the SOV 446 includes a solenoid 456 with a first coil 458 and a second coil 460. The first and second coils 458, 460 are electrically coupled to the first and second REUs 232, 234, respectively, via separate control channels. Thus, the SOV 446 includes redundant electrically controlled coils interfaced with redundant control channels. When either one of the two coils 458, 460 is activated, the SOV valve 446 is switched to or maintained in the ON state 454. Therefore, if one of the two coils 458, 460 fails, the other coil can still energize the solenoid of the SOV 446. For example, during normal operation, the first REU 232 applies electrical power to one of the two or more redundant coils 458, 460 to maintain the SOV 446 in the ON state 454. In this ON state 454, as shown in FIG. 4A, the SOV 446 fluidly couples the supply line 440 to a pilot 462 of the MSV 448. This provides pressure to maintain the MSV 448 in an active state, as disclosed in further detail below. As shown in FIG. 2A, if one of the ACEs 222, 224 and/or their associated REU 232, 234 fails and/or otherwise becomes inoperable, the other ACE and its REU can maintain the SOV 446 in the ON state 454 and, thus, maintain the MSV 448 in the active state. If both the first and second REUs 232, 234 cease power to the SOV 446 (e.g., via a command or because of a failure), the SOV 446 switches to the OFF state 452, which cuts off pressure to the pilot 462 of the MSV 448 and vents the pressure at the pilot 462 to the return line 442. Therefore, when the SOV 446 is supplied with an electrical signal from at least one of the first REU 232 or the second REU 234, the SOV 446 is switched to the ON state 454, and when the SOV 446 is not supplied with the electrical signal from at least one of the first REU 232 or the second REU 234, the SOV 446 is switched to the OFF state 452.

In the illustrated example, the MSV 448 is fluidly coupled to the supply line 440 and the return line 442 and controls the flow of pressurized hydraulic fluid to the EHSV 450. The MSV 448 is operable between a two states 464 and 466, referred to as the bypass state 464 and the active state 466. In the bypass state 464 the MSV 448 disconnects the supply line 440 and the return line 442 from the EHSV 450, and fluidly couples the first chambers 418, 422 and the second chambers 420, 424 to each other. An example of this state is disclosed in further detail in connection with FIG. 4C. In the active state 466, which is the state shown in FIG. 4A, the MSV 448 fluidly couples the supply line 440 and the return line 442 to the EHSV 450. In this example, the MSV 448 is a piloted valve. The MSV 448 is biased to the bypass state 464 (e.g., via a mechanical spring). If pressure is supplied to the pilot 462, such as when the SOV 446 is in the ON state 454, the MSV 448 is switched to and/or otherwise held in the active state 466. If pressure is ceased at the pilot 462, such as when the SOV 446 is in the OFF state 452, the MSV 448 is switched to and/or otherwise held the bypass state 464. Therefore, as long as either the first REU 232 or the second REU 234 applies energy to the channels 458, 460, the MSV 448 remains in the active state 466.

In the illustrated example, the hydraulic powered actuator 400 includes a first control fluid line 468 fluidly coupled to the first chambers 418, 422, and a second control fluid line 470 fluidly coupled to the second chambers 420, 424. As shown in FIG. 4A, the EHSV 450 is multi orifice flow-control component with the first and second control fluid line 468, 470, and two control ports 472 and 476. When the EHSV 450 is in the first control port 472, it meters the supply fluid (from the supply line 440) to the first control fluid line 468 and opens the second control fluid line 470 to return (to the return line 442). When the EHSV 450 is in the second control port 476, it meters the supply fluid (from the supply line 44) to the second control fluid line 470 and opens the first control fluid line 468 to return (to the return line 442). When the EHSV 450 in a middle port 474 (which may be referred to as the normal state), the pressure in the first and second control fluid lines 468, 470 are equal.

The EHSV 450 has two or more redundant coils. In particular, as shown in the callout in FIG. 4A, the EHSV 450 has a solenoid 477 with a first coil 478 and a second coil 480. The first coil 478 is electrically coupled to the first REU 232 and the second coil 480 is electrically coupled to the second REU 234. Thus, the EHSV 450 includes redundant electrically controlled coils interfaced with redundant control channels. Therefore, either the first or the second REUs 232, 234 can control the state of the EHSV 450. As such, if one of the ACEs 222, 224 and/or its associated REU 232, 234 fails, the other ACE and its REU can continue to operate the EHSV 450 to control the hydraulic powered actuator 400. If both the first and second REUs 232, 234 cease power to the EHSV 450 (e.g., via a command or because of a failure), the EHSV 450 switches to the middle port 474.

When the outboard left flap 112 reaches the desired position (e.g., the stowed position or any flap commanded position), the first REU 232 controls the EHSV 450 to the middle port 474 shown in FIG. 4A, thereby maintaining the outboard left flap 112 at the desired position. When the EHSV 450 is in the middle port 474, the pressures in the first and second control fluid lines 468, 478 are approximately equal. As such, the crank arm 306 is held in its current position and, thus, the outboard left flap 112 is held in its current position for short term. For long term (e.g., to compensate for internal hydraulic leakages either at pistons or at others), the outboard left flap 112 is held in its current position by a no-back 544 in FIG. 5.

In some examples, the first or second REUs 232, 234 control the movement of the outboard left flap 112 based on feedback from a position sensor 482 shown in FIG. 5. In some examples, the position sensor 482 measures or detects the position of the crank arm 306, which corresponds to a position of the outboard left flap 112. For example, while the hydraulic powered actuator 400 is moving the outboard left flap 112, the first and/or second REUs 232, 234 monitor the position of the crank arm 306 based on feedback from the position sensor 482. When the crank arm 306 reaches a position corresponding to the desired position of the outboard left flap 112, the first and/or second REUs 232, 234 commands the EHSV 450 to the middle port 474. The data (measurements) of the position sensor 482 from two actuators on a flap are processed by the ACEs to ensure the positions of two actuators do not result in an unacceptable force fight threshold which may cause a fatigue damage. Also, data (measurements) the position sensors from two flap pairs (e.g., left inboard flap and right inboard flap) are processed by the ACEs to ensure the positions of two flap pairs are synchronized (e.g., mismatch is small and does not introduce unwanted airplane rolling moment).

FIG. 4B shows an example in which the HCM 404 controls the hydraulic powered actuator 400 to move the outboard left flap 112 (FIG. 1) in the opposite direction such as, for example, if the first REU 232 or second REU 234 is commanded to deploy the outboard left flap 112 (e.g., move the outboard left flap 112 to the deploy position (FIG. 3B)). The EHSV 450 is controlled to the second control port 476. This causes the crank arm 306 to rotate in the clockwise direction in FIG. 4B, thereby moving the outboard left flap 112 toward the deployed position. As such, the EHSV 450 is operable between a first state (the first control port 472) to move the crank arm 306 in a first direction and a second state (the second control port 476) to move the crank arm 306 in a second direction.

As shown in FIG. 4B, the crank arm 306 has rotated an angle β relative to the position shown in FIG. 4A. The angle β can be controlled to be any angle. In some examples, the angle β represents the total angle to move the outboard left flap 112 (FIG. 1) between the stowed position (FIG. 3A) and the maximum deployed position (FIG. 3B).

As shown in FIGS. 4A and 4B, a cavity or chamber 484 is formed between the first and second sub-pistons 426, 428 of the first piston 412. The chamber 484 is filled with hydraulic fluid and connected to a hydraulic return system (e.g., an exhaust line 486 that fluidly couples the chamber 484 to the return line 442). It also serves as a lubricant for the rack and pinion, and the bearing 516 and 518 (shown in FIG. 5).

FIG. 4C shows an example of the hydraulic powered actuator 400 in which the SOV and MSV 446, 448 are controlled to their first states 452, 464, which is referred to as a bypass mode. In FIG. 4C the EHSV 450 is in second control port 476, because the EHSV 450 may have failed in this position (although the EHSV 450 may fail in any of the three ports/states). As disclosed above, in some instances, it may be desired to disable use of the hydraulic powered actuator 400. This may occur, for example, if there is a failure in the hydraulic powered actuator 400 or loss of the aircraft hydraulic system 230. In such an instance, it may be desirable to control the hydraulic powered actuator 400 into a bypass mode, such that the electric powered actuator 500 (FIG. 5) can control the crank arm 306 to move the outboard left flap 112 (FIG. 1). For example, if the first and second ACEs 222, 224 fail and/or otherwise become inoperable, the first and second REUs 232, 234 cease power to the solenoid of the SOV 446. As a result, the SOV 446 operates to the OFF state 452, as shown in FIG. 4C. In the OFF state 452, the SOV 446 vents the pilot 462 of the MSV 448 to the return line 442. As a result, the MSV 448 operates to the bypass state 464, which cuts off the supply of pressurized fluid to the EHSV 450. Therefore, the SOV 446 is operable between the OFF state 452 in which SOV 446 (via the MSV 448) shuts off the supply of pressurized hydraulic fluid to the EHSV 450, and the ON state 454 in which the SOV 446 enables the pressurized hydraulic fluid to be supplied to the EHSV 450. When the MSV 448 is in its bypass state 464, the MSV 448 fluidly couples the first and second control fluid lines 468, 470. Thus, the first chambers 418, 422 and the second chamber 420, 424 are fluidly coupled. This enables the piston assembly 410 to be moved freely and be back-driven by the electric powered actuator. The crank arm 306 can then be controlled via the electric powered actuator 500 (FIG. 5) to move the outboard left flap 112. Similarly, if the failure detector 266 determines there has been a failure of a mechanical portion of the hydraulic powered actuator 400 and/or there has been a loss of hydraulic power, the first and second ACEs 222, 224 can command the first and second REUs 232, 234 to switch the SOV 446 to the OFF state 452 (e.g., by ceasing power to the solenoid 456) to disable the hydraulic powered actuator 400.

FIG. 5 is a cross-sectional view of the first flap actuator 202 taken along line A-A in FIG. 4C. FIG. 5 shows the hydraulic powered actuator 400 and the electric powered actuator 500 of the first flap actuator 202 that can be used to move the crank arm 306 to control the position of the outboard left flap 112 (FIG. 1). The crank arm 306 rotates or pivots about an axis 502 shown in FIG. 5.

As shown in FIG. 5, the hydraulic powered actuator 400 is coupled to a support bracket 504 in the left wing 104 (FIG. 1). The support bracket 504 can be mounted to the rear spar 302 (FIG. 3A), the rib 304 (FIG. 3A), and/or any other structural support in the left wing 104. In the illustrated example, the first and second housings 406, 408 of the hydraulic powered actuator 400 are coupled to the support bracket 504 via one or more threaded fasteners 506 (e.g., bolts). In other examples, the first and second housings 406, 408 (and/or another part of the hydraulic powered actuator 400) can be coupled to the support bracket 504 using other fastening techniques. The first and second housings 406, 408 can be constructed of one more portions coupled together. The portions can be sealed via one or more static seal(s) 508

(e.g., an o-ring) and via one or more shaft seal(s) 514 (e.g., an oil seal) to prevent leakage of the hydraulic fluid.

In the illustrated example, the pinion gear 432 of the hydraulic powered actuator 400 is coupled to a shaft 510 (e.g., an axle). The shaft 510 extends through an opening 512 in the support bracket 504 and is coupled to the crank arm 306. Therefore, the pinion gear 432 is coupled to the crank arm 306 via the shaft 510. The electric powered actuator 500 is also coupled to the shaft 510, as disclosed in further detail herein. The pinion gear 432 and the shaft 510 are rotated on the axis 502. The pinion gear 432, the shaft 510, and the crank arm 306 are fixedly coupled and rotate together on the axis 502. As shown in FIG. 5, the shaft 510 extends through the shaft seal 514 (e.g., an oil seal), which prevents leakage of the hydraulic fluid out of the first and second housings 406, 408. In the illustrated example, the shaft 510 is supported by and rotatable on first and second bearings 516, 518 (e.g., ball or roller bearings). The first and second bearings 516, 518 enable the shaft 510, to rotate reliably while constraining its rotation on the axis 502.

FIG. 5 shows the ridge 438 on the inner surface of the first housing 406. The ridge 438 extends between the first and second tabs 434, 436 on the piston assembly 410. The ridge 438 prevents the piston assembly 410 from rotating, so that the rack 430 (FIG. 4A) remains aligned and engaged with the pinion gear 432.

In the illustrated example, the electric powered actuator 500 is coupled to the support bracket 504. In the illustrated example, the hydraulic powered actuator 400 and the electric powered actuator 500 are disposed on opposite sides of the support bracket 504. In other examples the hydraulic powered actuator 400 and the electric powered actuator 500 can be arranged in other configurations. The hydraulic powered actuator 400 is coupled to a first end of the shaft 510 and the electric powered actuator 500 is coupled to a second end of the shaft 510. Either or both of the hydraulic powered actuator 400 and the electric powered actuator 500 can be actuated to rotate the shaft 510 and, thus, rotate the crank arm 306. In the illustrated example, the electric powered actuator 500 includes a housing 520 that is coupled to the support bracket 504 via one or more threaded fasteners 522 (e.g., bolts). In other examples, the housing 520 (and/or another part of the electric powered actuator 500) can be coupled to the support bracket 504 using other fastening techniques. In some examples, the housing 520 is constructed of two or more portions coupled together.

The electric powered actuator 500 includes an electric motor 524 (e.g., a DC brushless motor) disposed in the housing 520. The electric motor 524 has a motor output shaft 526 that is rotated when the electric motor 524 is activated. A pinion 528 is coupled to the motor output shaft 526. The electric motor 524, the motor output shaft 526, and the pinion 528 are aligned and rotated along the axis 502. The motor output shaft 526 and the pinion 528 are coupled via an electric brake 538. The electric motor 524 and the electric brake 538 can be activated to rotate the pinion 528 in either direction to rotate the crank arm 306.

The motor output shaft 526 can be coupled to the shaft 510 via a reduction gear system. In particular, in the illustrated example of FIG. 5, the pinion 528 is coupled to the shaft 510 via a planetary gear system 530. In other examples, other types of systems and/or speed reducer gearboxes can be implemented. The planetary gear system 530 includes planetary gears 532, a ring gear 534, and a carrier 536. The pinion 528 (which may be considered a sun gear) is engaged (meshed) with the planetary gears 532. The planetary gears 532 are engaged (meshed) with the ring gear 534, which is disposed outside of the planetary gears 532. The ring gear 534 is coupled to the housing 520 and remains stationary. The planetary gears 532 are coupled to the carrier 536. The carrier 536 is coupled to the shaft 510 and, thus, is coupled to the crank arm 306. When the electric motor 524 and the electric brake 538 are activated, the pinion 528 rotates the planetary gears 532, which rotate the carrier 536, which rotates the shaft 510, which rotates the crank arm 306. In this example, the electric motor 524 is a bi-directional electric motor that can drive the pinion 528 in either direction to move the crank arm 306 in either direction.

In the illustrated example, the electric powered actuator 500 includes the electric brake 538. In this example, the electric brake 538 transmits the power of the motor output shaft 526 to the pinion 528 when the electric brake 538 is electrically activated. The electric brake 538 is deactivated (e.g., OFF) when hydraulic powered actuator 400 is in ACTIVE mode and electric powered actuator 500 is OFF. When the electric brake 538 is deactivated (e.g., OFF), the pinion 528 and the motor output shaft 526 are disengaged. The electric brake 538 is activated (e.g., ON) when the hydraulic powered actuator 400 is in BYPASS mode and the electric powered actuator 500 is ON. When the electric brake 538 is activated (e.g., ON), the pinion 528 and the motor output shaft 526 are engaged. In HYBRID mode, the electric brake 538 is activated (e.g., ON) (and, thus, the pinion 528 and the motor output shaft 526 are engaged).

As disclosed herein, the first flap actuator 202 can be operated in the hydraulic powered mode in which only the hydraulic powered actuator 400 is activated (e.g., in active mode) to move the outboard left flap 112 (FIG. 1) and the electric powered actuator 500 is OFF, the electric powered mode in which only the electric powered actuator 500 is activated to move the outboard left flap 112 while the hydraulic powered actuator 400 is in bypassed mode, and the hybrid mode in which both the hydraulic powered actuator 400 and the electric powered actuator 500 are activated (e.g., in active mode) and simultaneously actuate the outboard left flap 112. When the hydraulic powered actuator 400 is in active mode, the shaft 510 also rotates the carrier 536, which rotates the planetary gear system 530. Assuming the first flap actuator 202 is operated in the electric mode, the electric powered actuator 500 is in active mode but the hydraulic powered actuator 400 is in bypass mode. In such an example, the electric motor 524 rotates the shaft 510 to rotate the crank arm 306. Because the pinion gear 432 is engaged with the rack 430 (FIG. 4A), the pinion gear 432 back-drives the rack 430 and the pistons. As disclosed above, the hydraulic powered actuator 400 can be switched to the bypass mode (shown in FIG. 4C). Assuming the flap actuator 202 is operated in the hybrid mode, both the hydraulic powered actuator 400 and the electric powered actuator 500 are in active mode simultaneously. In such an example, the outpower of crank arm 306 is a summation of both the hydraulic powered actuator 400 and the electric powered actuator 500.

As disclosed above, the first or second REUs 232, 234 (FIG. 4A) controls the position of the outboard left flap 112 (FIG. 1) using the position sensor 482 as a feedback. In some examples, the position sensor 482 is operatively coupled to the carrier 536. For example, as shown in FIG. 5, the position sensor 482 is coupled to a gear 540 that is engaged with a gear 542 on the carrier 536. The gear 540 rotates as the carrier 536 is rotated. The position sensor 482 measures the position (e.g., angular position) of the gear 540, which corresponds to the position of the crank arm 306 and, thus, the position of the outboard left flap 112. Therefore, the position sensor is operatively coupled to the shaft 510. The position sensor 482 can be implemented as any type of sensor, and for positioning accuracy a resolver is often used.

In the illustrated example, the first flap actuator 202 includes a no-back 544 (e.g., a directional movement restrictor). The no-back 544 allows the crank arm 306 be actuated by the motion of shaft 510 and restricts movement of the shaft 510 due to the crank arm 306. In the illustrated example, the no-back 544 is coupled to the shaft 510 and the support bracket 504.

To operate the electric powered actuator 500 in the electric powered mode or the hybrid mode, the first ACE 222 activates the first switch 258, which electrically connects the aircraft electrical system 248 to the first EMCU 250. The first EMCU 250 controls the supply of electric power for activating the electric motor 524 and the electric brake 538. The first EMCU 250 controls the electric motor 524 and the electric brake 538 based on commands from the first ACE 222. In particular, the first EMCU 250 receives a commanded position from the first ACE 222, and generates control signals for the electric motor 524 and the electric brake 538. The first EMCU 250 can activate the electric motor 524 to move the outboard left flap 112 to any position between the stowed position (shown in FIG. 3A) and the deployed position (shown in FIG. 3B). Once in the desired position, the first EMCU 250 can deactivate the electric motor 524 and deactivate the electric brake 538. The no-back 544 holds the outboard left flap 112 in position. The first EMCU 250 controls the position of the crank arm 306 (and, thus, the outboard left flap 112) via the position sensor 482 from the first REU 232 or the second REU 234. In this manner, the first ACE 222 controls the electric powered actuator 500 of the first flap actuator 202.

In this example, the first ACE 222 is also one of the ACEs that controls the hydraulic powered actuator 400 (as shown in FIGS. 4A-4C). In other ones of the flap actuators 202-216, a different ACE controls the electric powered actuator than the hydraulic powered actuator. For example, referring back to FIGS. 2A and 2B, the first and second ACEs 222, 224 control the hydraulic powered actuator of the second flap actuator 204 in the hydraulic powered mode and the hybrid mode, but the third ACE 226 controls the electric powered actuator of the second flap actuator 204 in the electric powered mode and the hybrid mode.

Referring back to FIGS. 2A and 2B, the system 200 includes a redundant architecture that enables control of the flaps 112-118 during various failures situations. As shown in FIG. 2A, each of the hydraulic powered actuators of the flap actuators 202-216 is controllable by two of the ACEs 222-228. This results in a redundant system that enables the DTE control system 218 to continue to operate in the hydraulic powered mode even if one or more of the ACEs 222-218 and/or the REUs 232-246 fail and/or otherwise become inoperable. For example, as shown in FIG. 2A, the first flap actuator 202 is electrically coupled to and controllable by the first ACE 222 (via the first REU 232) and the second ACE 224 (via the second REU 234). During normal operation, the first ACE 222 and the second ACE 224 provide the same command signals for control of the first flap actuator 202. However, if the first ACE 222 and/or otherwise becomes inoperable, the second ACE 224 can still control the hydraulic powered actuator of the first flap actuator 202. Thus, no interruption of the system 200 occurs. Each of the other flap actuators 114-118 is similarly electrically coupled to and controllable by two of the ACEs 222-228.

The example system 200 can also continue to operate even if a second ACE fails. For example, if the first ACE 222 and the third ACE 226 fail and/or otherwise become inoperable, the DTE control system 218 can continue to control the flap actuators 202-216 in the hydraulic powered mode using the second ACE 224 and the fourth ACE 228. In particular, the second ACE 224 can continue to control the first, second, seventh, and eighth flap actuators 202, 204, 214, 216 for moving the outboard left and right flaps 112, 118. Similarly, the fourth ACE 228 can continue to control the third, fourth, fifth, and sixth flap actuators 206-212 for moving the inboard left and right flaps 114, 116.

In some examples, if two of the ACEs 222-228 fail that are associated with the same flap, the hydraulic powered actuators of those flaps are switched to the bypass mode and are held in position via the no-backs. As such, the flap is not movable. For example, if the first and second ACEs 222, 224 fail and/or otherwise become inoperable, the first, second, seventh, and eighth flap actuators 202, 204, 214, 216 are switched to their bypass mode and the outboard left and right flaps 112, 118 are held in their current positions via their no-backs. In such an instance, the inboard left and right flaps 114, 116 may be still be operable. The alert generator 270 may generate an alert at the flight deck 272 to indicate that certain ones of the flaps are inoperable. A trained pilot can account for this situation and compensate for the loss of one the pair of flaps.

If there is a mechanical failure of one of the flap actuators 202-216, all of the flap actuators associated with the ACE connected to the failed flap actuator can be commanded to the bypass position and the flaps can be held in place, such that a symmetrical pair of the flaps is inoperable. For example, assume there is a mechanical failure of the first flap actuator 202. In such an instance, the first and second ACEs 222, 224 command the hydraulic powered actuators associated with the first, second, seventh, and eighth flap actuators 202, 204, 214, 216 to switch to their bypass mode and the outboard left and right flaps 112, 118 are held in their current positions via the no-backs of the first, second, seventh, and eighth flap actuators 202, 204, 214, 216. In such an instance, the alert generator 270 may generate an alert at the flight deck 272 to indicate that certain ones of the flaps are inoperable. A trained pilot can account for this situation and compensate for the loss of one the pair of flaps.

Another failure situation may occur is if the aircraft hydraulic systems 230 (FIG. 4A) fails. In such an instance, the ACEs 222-228 switch each of the flap actuators 202-216 from their hydraulic powered mode to their electric powered mode, so that the electric powered actuators can be used to control the flaps 112-118. For example, the ACEs 222-228 switch the mode selector valves (e.g., the MSV 448 (FIG. 4A)) to their bypass states, and activate the switches 258-264 to provide electrical power to the EMCUs 250-256. Then, the EMCUs 250-256 can control the electric powered actuators to move the respective flaps 112-118.

In another failure instance, the aircraft hydraulic system 230 can lose some but not all of its hydraulic power. For example, the aircraft hydraulic system 230 may be pressurized using pumps driven by the engines 108, 110 (FIG. 1). If one of the engines 108, 110 fails and/or otherwise becomes inoperable, the pressure in the aircraft hydraulic system 230 is reduced. In such an instance, the ACEs 222-228 can operate the flaps actuators 202-216 in their hybrid mode. In the hybrid mode, the hydraulic powered actuator and the electric powered actuator of each of the flap actuators 202-216 operate together to control the movement of the corresponding flaps 112-118.

While an example manner of implementing the DTE control system 218 is illustrated in FIGS. 2A and 2B, one or more of the elements, processes and/or devices illustrated in FIGS. 2A and 2B may be combined, divided, re-arranged, omitted, eliminated and/or implemented in any other way. Further, the example ACEs 222-228, the example REUs 232-246, the example EMCUs 250-256, the example switches 258-264, the example failure detector 266, the example alert generator 270, and/or, more generally, the example DTE control system 218 of FIGS. 2A and 2B may be implemented by hardware, software, firmware and/or any combination of hardware, software and/or firmware. Thus, for example, any of the example ACEs 222-228, the example REUs 232-246, the example EMCUs 250-256, the example switches 258-264, the example failure detector 266, the example alert generator 270, and/or, more generally, the example DTE control system 218 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example ACEs 222-228, the example REUs 232-246, the example EMCUs 250-256, the example switches 258-264, the example failure detector 266, and/or the example alert generator 270 is/are hereby expressly defined to include a non-transitory computer readable storage device or storage disk such as a memory, a digital versatile disk (DVD), a compact disk (CD), a Blu-ray disk, etc. including the software and/or firmware. Further still, the example DTE control system 218 of FIGS. 2A and 2B may include one or more elements, processes and/or devices in addition to, or instead of, those illustrated in FIGS. 2A and 2B, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowchart representative of example hardware logic, machine readable instructions, hardware implemented state machines, and/or any combination thereof for implementing the DTE control system 218 of FIGS. 2A and 2B are shown in FIGS. 6-11. The machine readable instructions may be one or more executable programs or portion(s) of an executable program for execution by a computer processor and/or processor circuitry, such as the processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowcharts illustrated in FIGS. 6-14, many other methods of implementing the example DTE control system 218 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6-11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 6:
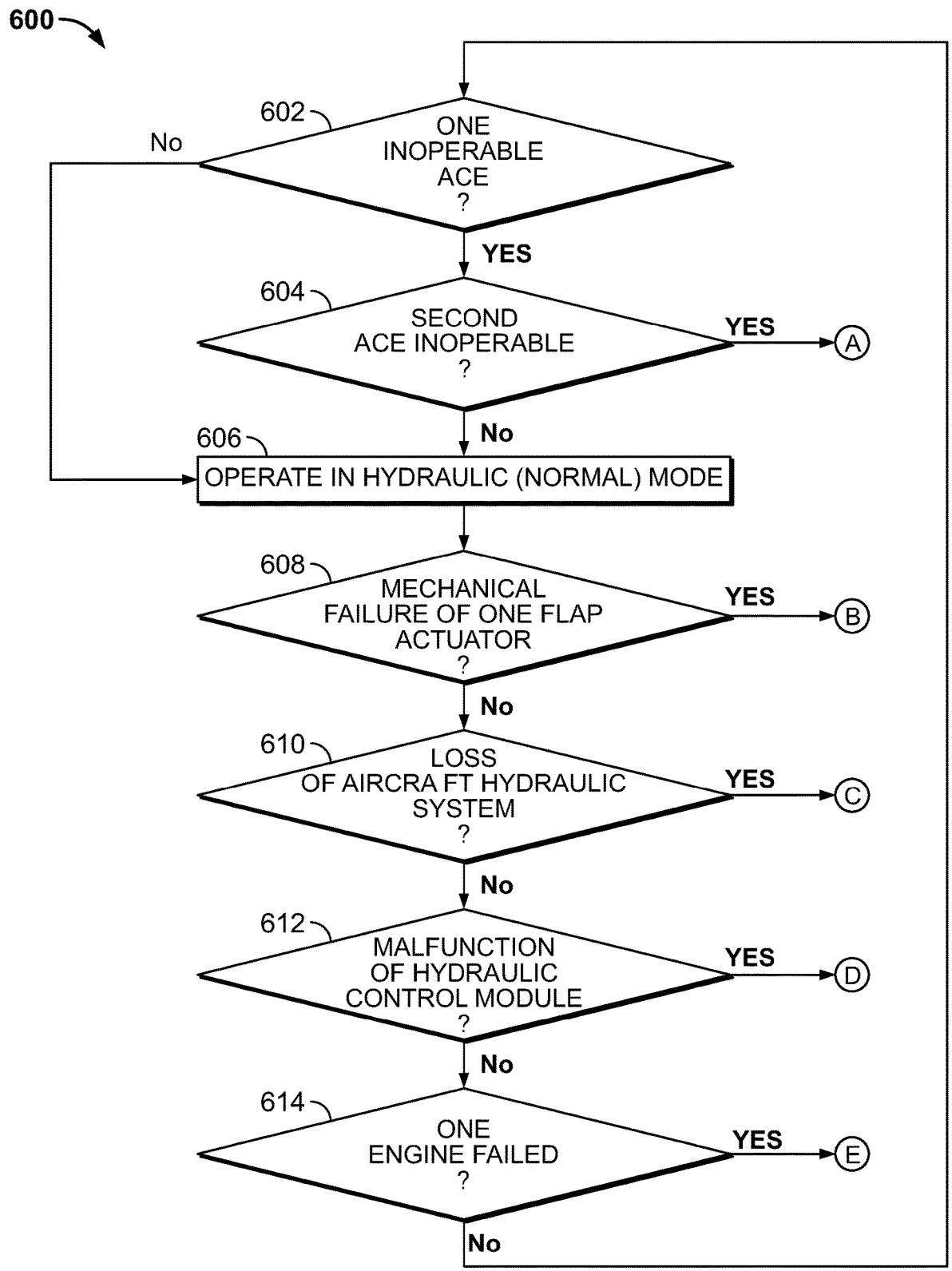
FIG. 6 is a flowchart representative of machine readable instructions to implement the example DTE control system of FIGS. 2A and 2B for checking whether a failure of a component or system of the example aircraft has occurred.

FIG. 6 is a flowchart of an example process 600 that can be implemented by the DTE control system 218 of the system 200 of FIGS. 2A and 2B. The example process 600 can be used to determine if a failure has occurred and disable certain one of the flap actuators 202-216 or switch certain ones of the flap actuators 202-216 between the different modes. The example process 600 may begin when the aircraft 100 is first dispatched. At block 602, the failure detector 266 determines if one of the ACEs 222-228 is inoperable. In some examples, the failure detector 266 can determine if one of the ACEs 222-228 is inoperable based on feedback from the one or more sensor(s) 268.

If the failure detector 266 determines that one of the ACEs 222-228 is inoperable (determined at block 602), control proceeds to block 604. At block 604, the failure detector 266 determines if a second ACE is inoperable. If two of the ACEs 222-228 are inoperable, control proceeds to the example process disclosed in connection with FIG. 7. Otherwise, if a second ACE is not inoperable (i.e., only one ACE is inoperable), control proceeds to block 606.

If none of the ACEs 222-228 are inoperable, or if only one of the ACEs 222-228 is inoperable, control proceeds to block 606. At block 606, the DTE control system 218 operates the flap actuators 202-216 in the hydraulic (normal) powered mode. In the hydraulic powered mode, the ACEs 222-228 control the flap actuators 202-216 using their hydraulic powered actuators. As disclosed above, the DTE control system 218 includes an architecture using redundant ACEs. Therefore, if one of the ACEs 222-228 is inoperable, another ACE can continue to operate the associated flap actuators. For example, if the first ACE 222 fails, the second ACE 224 can continue to operate the first, second, seventh, and eighth flap actuators 202, 204, 214, 216 using their hydraulic powered actuators.

During flight, the DTE control system 218 continues to monitor to determine if another failure occurs. Depending on the type of failure and/or whether other failures are present, the DTE control system 218 may continue to operate in the hydraulic (normal) powered mode or switch to the electric powered mode or the hybrid mode.

At block 608, the failure detector 266 determines if there is a mechanical failure of one of the flap actuators 202-216. In some examples, the failure detector 266 can determine if there a mechanical failure of one of the flap actuators 202-216 based on feedback from the one or more sensor(s) 268. If there is a mechanical failure of one of the flap actuators 202-216, control proceeds to the example process disclosed in connection with FIG. 8. If there is not a mechanical failure of one of the flap actuators 202-216, control proceeds to block 610.

At block 610, the failure detector 266 determines if there has been a loss of the aircraft hydraulic system 230. In some examples, the failure detector 266 can determine if there has been a loss of the aircraft hydraulic system 230 based on feedback from the one or more sensor(s) 268. For example, one of the sensor(s) 268 may be a pressure sensor that monitors the pressure of the aircraft hydraulic system 230. If the pressure drops below a threshold, the failure detector 266 determines there has been a loss of the aircraft hydraulic system 230. If there has been a loss of the aircraft hydraulic system 230, control proceeds to the example process disclosed in connection with FIG. 9. If there has not been a loss of the aircraft hydraulic system 230, control proceeds to block 612.

At block 612, the failure detector 266 determines if there is a malfunction of one of the hydraulic control modules (e.g., the HCM 404). A malfunction may occur if one of the electrical components (e.g., a solenoid of a solenoid valve) has failed. If there is a malfunction of one of the hydraulic control modules, control proceeds to the example process disclosed in connection with FIG. 10. If there has not been a malfunction of one of the hydraulic control modules, control proceeds to block 614.

At block 614, the failure detector 266 determines if one of the engines 108, 110 of the aircraft 100 has failed. The failure of one of the engines 108, 110 causes a reduction in hydraulic power (e.g., a reduction in pressure) in the aircraft hydraulic system 230. If one of the engines 108, 110 has failed, control proceeds to the example process disclosed in connection with FIG. 11. If one of the engines has not failed (i.e., both of the engines 108, 110 are operable), control proceeds back to block 602. In such an instance, the DTE control system 218 continues to operate the flap actuators 202-216 in their hydraulic powered modes. The example process 600 can be repeated at a certain frequency (e.g., every second, every minute, etc.) to continuously check for failure(s) and dynamically switch between the different modes based on the failure(s).

Figure 7:
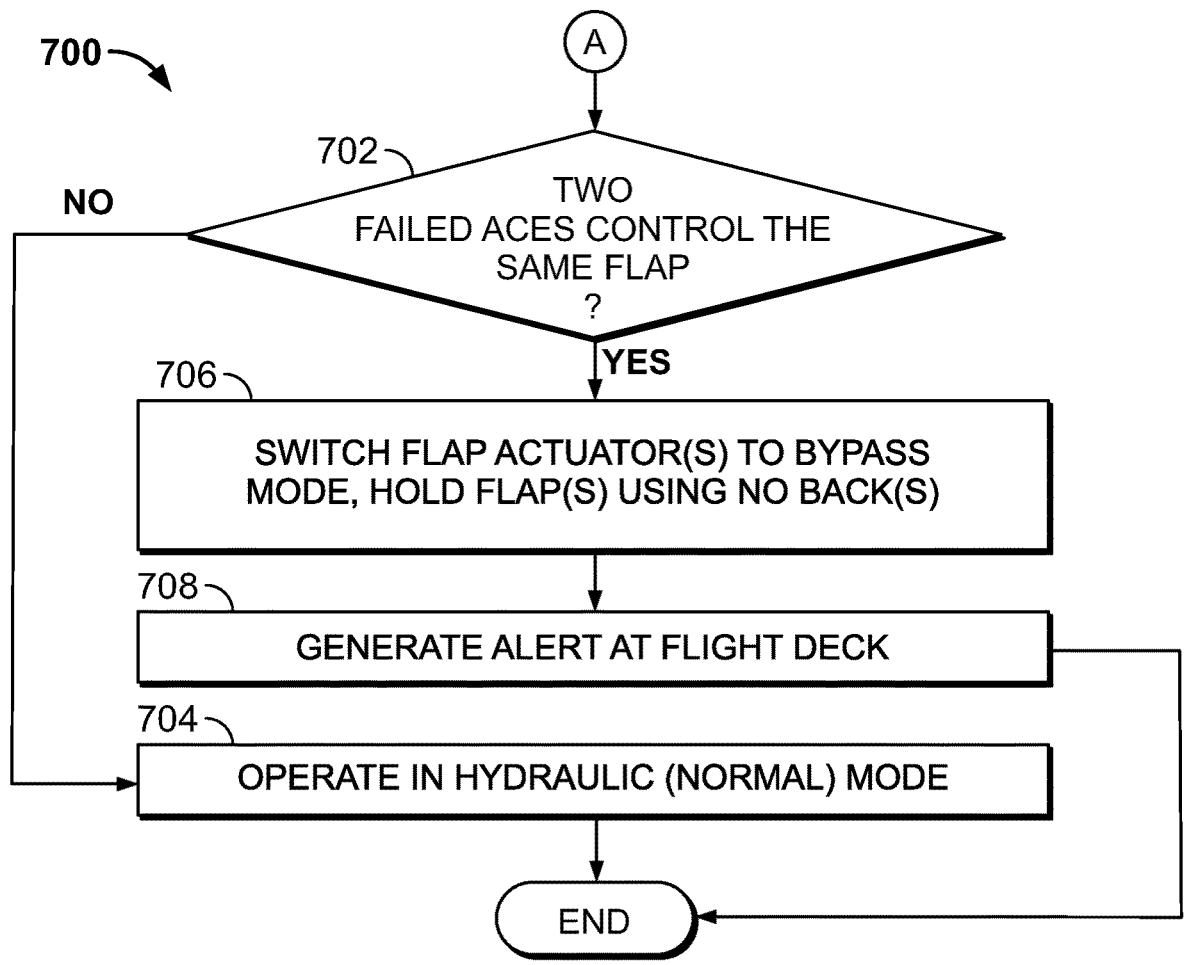
FIG. 7 is a flowchart representative of machine readable instructions that may be executed in connection with the flowchart of FIG. 6 when two actuator control electronics (ACEs) of the example DTE actuation system are inoperable.

FIG. 7 is a flowchart of an example process 700 implemented by the DTE control system 218 of the system 200 when two of the ACEs 222-228 are inoperable. In some examples, the failure detector 266 determines two of the ACEs 222-228 have failed at block 604 of FIG. 6. At block 702, the failure detector 266 determines whether the two ACEs that failed control the same flap. In some examples, the failure detector 266 utilizes the case tables 1-16 shown in FIGS. 12A-12D. The case tables are labeled Case 1-Case 16. These case tables may be stored in a memory, such as a mass storage device 1428 in FIG. 14. In the case tables, a number "1" means a failure of an ACE to control its associated flap actuators, and a number "0" means the ACE operation is normal. The first column of case tables (Cases 1, 5, 9, 13) show instances when only one ACE has failed. The second, third, and fourth columns of the case tables (Cases 2-4, 6-8, 10-12, 14-16) show instances where a second ACE has failed during flight. The failure detector 266 consults these case tables to determine if the two ACEs that failed control the same flap. In particular, Cases 2, 6, 12, and 16 represent instances where the two failed ACEs control the same flap, whereas Cases 3, 4, 7, 8, 10, 11, 14, and 15 represent instances where the two failed ACEs do not control the same flap.

If the two failed ACEs do not control the same flap, such as in Cases 3, 4, 7, 8, 10, 11, 14, and 15, control proceeds to block 704. At block 704, the DTE control system 218 operates the flap actuators 202-216 in the hydraulic (normal) mode. For example, in Case 3, the first ACE 222 and the third ACE 226 have failed. However, the first ACE 222 and the third ACE 226 do not control the same flaps. Therefore, the second ACE 224 can still control the flap actuators 202, 204, 214, 216 associated with the outboard left and right flaps 112, 118, and the fourth ACE 228 can still control the flap actuators 216-212 associated with the inboard left and right flaps 114, 116. As such, the DTE control system 218 can continue to operate the system 200 using hydraulic power as normal. Further, as shown in FIGS. 12A-12D, a flight message is not displayed. In some examples, control proceeds back to block 602 of FIG. 6 and the example process 600 repeats.

If the two failed ACEs control the same flap, such as in Cases 2, 6, 12, and 16, control proceeds to block 706. For example, in Cases 2 and 6, the first ACE 222 and the second ACE 224 have failed. The first and second ACEs 222, 224 control the first and second flap actuators 202, 204 associated with the outboard left flap 112 and the seventh and eighth flap actuators 214, 216 associated with the outboard right flap 118. Similarly, in Cases 12 and 16, the third ACE 226 and the fourth ACE 228 have failed. The third and fourth ACEs 226, 228 control the flap actuators associated with the inboard left and right flaps 114, 116.

At block 706, the flap actuators associated with the two failed ACEs are controlled or switched to their bypass modes, and the associated flaps are held in place via their no-backs. In some example, controlling the flap actuators to their bypass mode occurs automatically when the two ACEs fail. For example, as explained in connection with FIG. 4C, if the first and second ACEs 222, 224 fail, the first and second REUs 232, 234 cease power to the solenoid of the SOV 446, which controls the SOV 446 to its OFF 452, which controls the MSV 448 to its bypass state 464. In other examples, the first and/or second ACEs 222, 224 may command the first and/or second REUs 232, 234 to control the SOV 446 to its OFF 452. The no-backs (e.g., the no-back 544) associated with the flap actuators hold the flap actuators in their current positions and, thus, the associated flaps are locked in place. For example, in Case 2, the first and second ACEs 222, 224 have failed. In such an instance, the hydraulic powered actuators associated with the first, second, seventh, and eighth flap actuators 202, 204, 214, 216 are controlled or switched to their bypass modes. The no-backs associated with the first, second, seventh, and eighth actuators 202, 204, 214, 216 hold the actuators in place and, thus, lock the outboard left and right flaps 112, 118 in place. As a result, the outboard left and right flaps 112, 118 are inoperable. Even though the outboard left and right flaps 112, 118 are inoperable, the inboard left and right flaps 114, 116 can still be controlled as normal and used to control the aircraft 100.

At block 708, the alert generator 270 generates an alert at the flight deck 272. The alert may be an activation of a light, display of a message, activation of audible alert, and/or any other type of alert. The alert signals to the pilot that the pilot is to follow a non-normal procedure for operating the aircraft 100 (e.g., landing the aircraft), because one symmetrical pair of the flaps is inoperable. This type of malfunction is considered minor, because a trained pilot can account for this failure and still safely land the aircraft 100. Thus, the system 200 can continue to operate with only a minor change in function.

Figure 8:
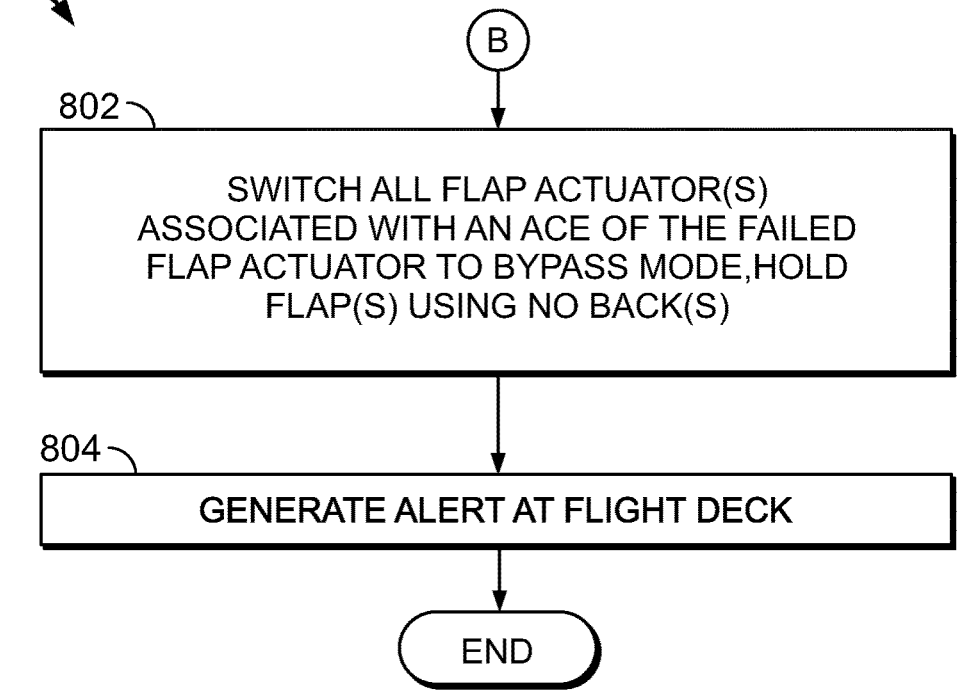
FIG. 8 is a flowchart representative of machine readable instructions that may be executed in connection with the flowchart of FIG. 6 when a mechanical failure of a flap actuator has occurred.

FIG. 8 is a flowchart of an example process 800 implemented by the DTE control system 218 of the system 200 when there is a mechanical failure of one of the flap actuators 202-216. In some examples, the failure detector 266 determines there is a mechanical failure of one of the flap actuators 202-216 at block 608 of FIG. 6. At block 802, all of the flap actuators associated with an ACE of the failed flap actuator are controlled or switched to their bypass mode, and the associated flaps are held in place via their no-backs. In some examples, the failure detector 266 utilizes the case tables 1-8 shown in FIG. 13 to determine which flap actuators to control to their bypass modes. The case tables are labeled Case 1-Case 8. These case tables may be stored in a memory, such as the mass storage device 1428 in FIG. 14. In the case tables of FIG. 13, a number "1" means a failure of the flap actuator, and a number "0" means the flap actuator is operating normally. In these case tables, a white block indicates the flap actuator is to be controlled or switched to its bypass mode, and a shaded block indicates the flap actuator can be operated in the normal mode via hydraulic actuation. For example, assume the first flap actuator 202 (the outboard actuator of the outboard left flap 112) has failed. This event corresponds to Case 1. In Case 1, the blocks for the outboard (OB) and inboard (IB) actuators for the outboard (OB) left flap 112 and the outboard right flap 118 are white. These correspond to the first, second, seventh, and eighth flap actuators 202, 204, 214, 216. These flap actuators are all controlled by the same ACEs. In such an instance, the hydraulic powered actuators associated with the first, second, seventh, and eighth flap actuators 202, 204, 214, 216 are controlled to their bypass modes (e.g., via a command from the first and second ACEs 222, 224 and/or deactivation of the first and second ACEs 222, 224). The no-back devices associated with the first, second, seventh, and eighth actuators 202, 204, 214, 216 hold the actuators in place and, thus, lock the outboard left and right flaps 112, 118 in place. As a result, the outboard left and right flaps 112, 118 (which are a symmetrical pair of flaps) are inoperable. Even though the outboard left and right flaps 112, 118 are inoperable, the inboard left and right flaps 114, 116 can still be controlled as normal and used to control the aircraft 100.

At block 804, the alert generator 270 generates an alert at the flight deck 272, similar to the alert generated at block 708 in FIG. 7. The alert signals to the pilot that the pilot is to follow a non-normal procedure for operating the aircraft (e.g., landing the aircraft), because one symmetrical pair of the flaps is inoperable. This type of malfunction is considered minor, because a trained pilot can account for this failure and still safely land the aircraft 100. Thus, the system 200 can continue to operate with only a minor change in function.

Figure 9:
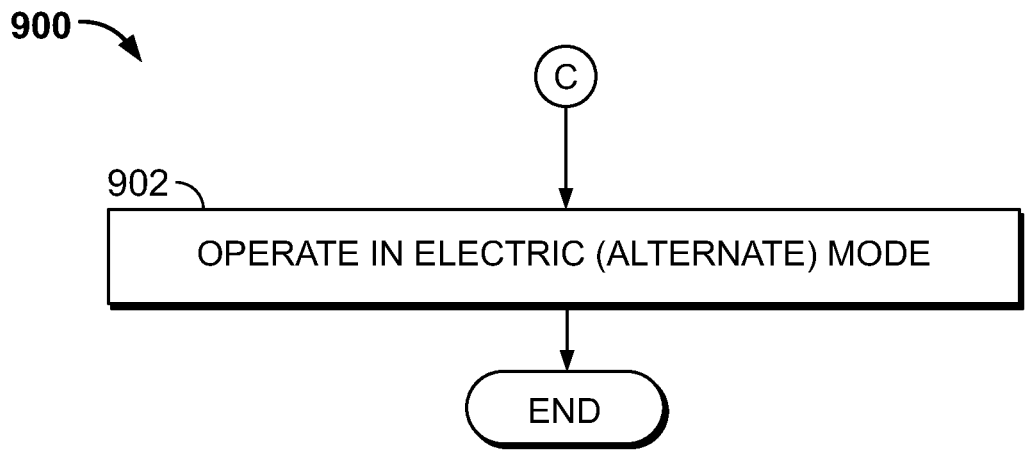
FIG. 9 is a flowchart representative of machine readable instructions that may be executed in connection with the flowchart of FIG. 6 when a loss of an aircraft hydraulic system has occurred.

FIG. 9 is a flowchart of an example process 900 implemented by the DTE control system 218 of the system 200 when there is a loss of the aircraft hydraulic system 230. In some examples, the failure detector 266 determines when there is a loss of the aircraft hydraulic system 230 at block 610 of FIG. 6. Without hydraulic power, the hydraulic powered actuators of the flap actuators 202-216 cannot be controlled. At block 902, the DTE control system 218 operates the flap actuators 202-216 in their electric (alternate) powered mode. In some examples, the ACEs 222-228 control or switch the flap actuators 202-216 to their electric powered modes by activating the switches 252-258, which enables the EMCUs 250-256 to control the electric powered actuators of the flap actuators 202-216. Further, the ACEs 222-228 switch the hydraulic powered actuators into their bypass modes (e.g., by switching the SOV 446 to the OFF 452). Once in the electric powered mode, the ACEs 222-228 and EMCUs 250-256 can control the flap actuators 202-216 by operating the electric powered actuators of the flap actuators 202-216. Therefore, the DTE control system 218 is switched or controlled from the hydraulic (normal) powered mode to the electric (alternate) powered mode. In this example, all of the flaps 112-118 are still operable.

Figure 10:
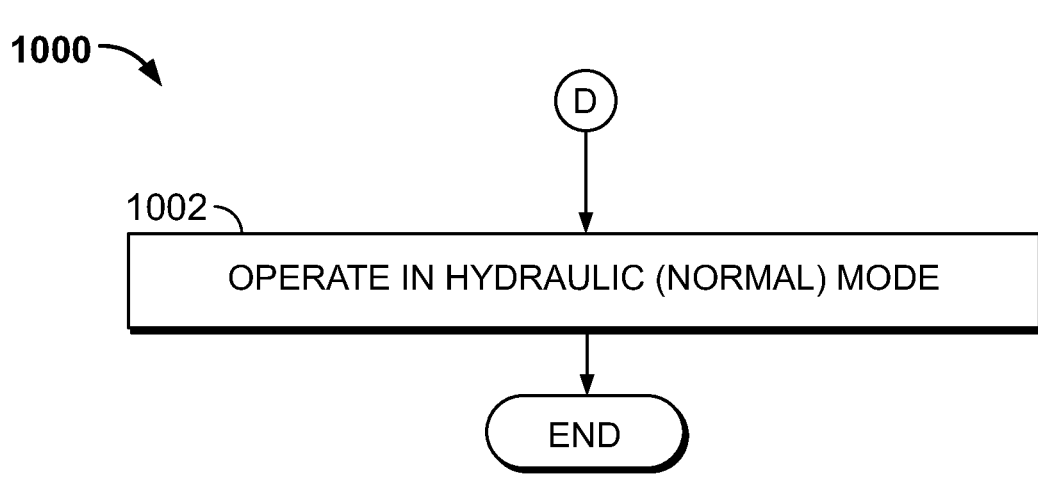
FIG. 10 is a flowchart representative of machine readable instructions that may be executed in connection with the flowchart of FIG. 6 when a malfunction in a hydraulic control module has occurred.

FIG. 10 is a flowchart of an example process 1000 implemented by the DTE control system 218 of the system 200 when there is a malfunction in one of the hydraulic control modules. This may be determined by the failure detector 266 at block 612 of FIG. 6. If there is a malfunction in one of the hydraulic control modules, at block 1002, the DTE control system 218 can continue to operate the flap actuators 202-218 in the hydraulic (normal) powered mode. As disclosed above, the hydraulic control modules (e.g., the HCM 404 of FIGS. 4A-4C) include redundant architecture, such that if one electrical components and/or one REUs fails, another electrical component and/or another REU can continue to operate the hydraulic control module. For example, a disclosed in connection with the HCM 404 of FIGS. 4A-4C, the SOV 446 and the EHSV 450 both include dual coils (e.g., channels). As a result if one of the coils fails and/or one of the REUs 232, 234 fails, the other coil and/or other REU can continue to operate the SOV 446 and the EHSV 450. Therefore, the DTE control system 218 can continue to operate the flap actuators 202-216 in the hydraulic (normal) powered mode.

Figure 11:
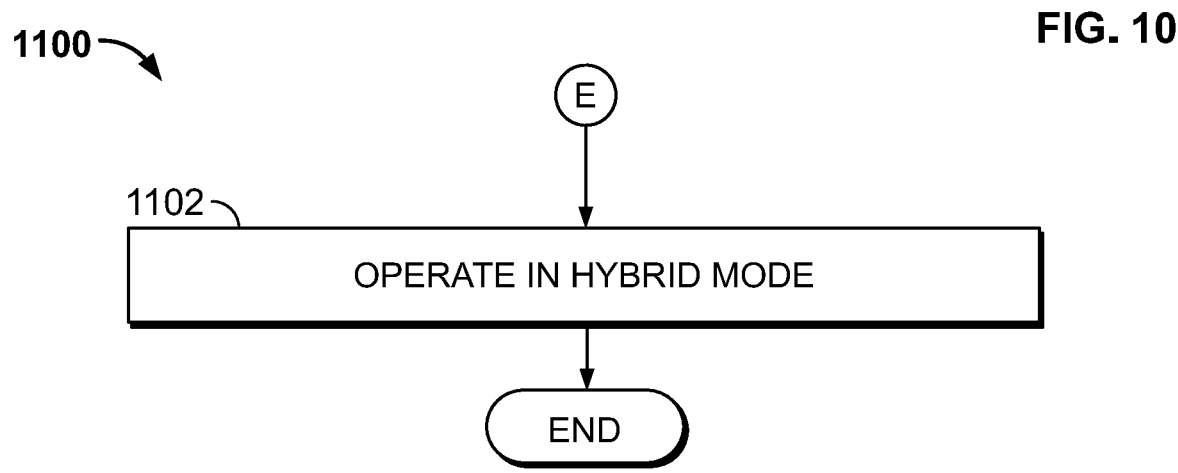
FIG. 11 is a flowchart representative of machine readable instructions that may be executed in connection with the flowchart of FIG. 6 when a failure or loss of one aircraft engine has occurred.

FIG. 11 is a flowchart of an example process 1100 implemented by the DTE control system 218 of the system 200 when one of the engines 108, 110 has failed. This may be determined by the failure detector 266 at block 614 of FIG. 6. When one of the engines 108, 110 fails, the pressure of the hydraulic fluid of the aircraft hydraulic system 230 is reduced (e.g., halved or cut by 50%). Thus, less pressure is provided for actuating the hydraulic powered actuators of the flap actuators 202-216. At block 1102, the DTE control system 218 operates the flap actuators 202-216 in their hybrid mode. In particular, the DTE control system 218 operates the flap actuators 202-216 by activating/actuating both the hydraulic powered actuators and the electric powered actuators simultaneously. The electric powered actuators help compensate for the reduction in power from the hydraulic powered actuators. For example, referring back to FIGS. 4A-4D, the hydraulic powered actuator 400 and the electric powered actuator 500 can be activated/actuated simultaneously to move the crank arm 306 and, thus, move the outboard left flap 112. The hydraulic powered actuator 400 is controlled by the first and/or second ACEs 222, 224, and the electric powered actuator 500 is controlled by the first ACE 222. Therefore, operating the flap actuator 202 in the hybrid mode can include controlling the hydraulic powered actuator 400 via the first ACE 222 and/or the second ACE 224, and controlling the electric powered actuator 500 via the first ACE 222. As such, the DTE control system 218 uses a combination of both hydraulic and electric power to operate the flap actuators 202-216.

Some aircraft regulations govern the retraction maneuver requirements from the deployed position (full maximum flap) to the stowed position. The hydraulic system and the flap actuators of the aircraft are sized according to these requirements. Because the flap actuators 202-216 disclosed herein can be operated using a combination of hydraulic power and electrical power, the demand of the aircraft hydraulic system 230 is reduced. Thus, the hydraulic pump(s) in the aircraft 100 can be reduced in size and power. This reduces the overall load on the engines 108, 110. Further, this reduces the physical size of the flap actuators 202-216, which reduces the spacing requirements in the wings 104, 106 of the aircraft 100*t*. This enables thinner, lighter wings to be constructed, which are more efficient.

FIG. 14 is a block diagram of an example processor platform 1400 structured to execute the instructions of FIGS. 6-11 to implement the DTE control system 218 of FIGS. 2A and 2B. The processor platform 1400 can be, for example, a server, a personal computer, a workstation, a self-learning machine (e.g., a neural network), a mobile device (e.g., a cell phone, a smart phone, a tablet such as an iPad'), a DVD player, a CD player, a digital video recorder, a Blu-ray player, a gaming console, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1412 implements the example ACEs 222-228, the example REUs 232-246, the example EMCUs 250-256, the example switches 258-264, the example failure detector 266, and the example alert generator 270.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory

1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1022 permit(s) a device and/or a user to enter data and/or commands into the processor 1412. In this example, the input device(s) 1422 include the sensor(s) 268 and the position sensors (e.g., the position sensor 482). Additionally or alternatively, the input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. In this example, the output device(s) 1424 include the flap actuators 202-216 (e.g., the HCMs of the hydraulic powered actuators, and the electric motors of the electric powered actuators) and the flight deck 272. Additionally or alternatively, the output device(s) 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives.

The machine executable instructions 1432 of FIGS. 6-11 may be stored in the mass storage device 1428, in the volatile memory 1414, in the non-volatile memory 1416, and/or on a removable non-transitory computer readable storage medium such as a CD or DVD.

From the foregoing, it will be appreciated that example methods, apparatus, systems, and articles of manufacture have been disclosed that provide redundant control of one or more flap actuators of an aircraft DTE actuation system. The examples disclosed herein enable the complete (or partial) control of the one or more flap actuators in the event of failure or loss of one or more components or systems of the aircraft.

Example linkage assemblies have also been disclosed that are more compact than known linkage systems. The example linkage systems enable the use of thinner wings, which produce more efficient flight.

Example hydraulic-electric flap actuators have also been disclosed that can advantageously operate in multiple modes to ensure continuous or near continuous operation of the flap actuator. The example hydraulic-electric flap actuators can operate in a hybrid mode in which both hydraulic power and electrical power is used to operate the flap actuator. This reduces the demand on the aircraft hydraulic systems, thereby enabling a reduction in the size and components of the aircraft hydraulic system.

Example methods, apparatus, systems, and articles of manufacture for redundant actuation of control surfaces are disclosed herein. Further examples and combinations thereof include the following:

Example 1 is an aircraft includes a wing and a flap coupled to the wing. The flap is movable between a stowed position and a deployed position. The aircraft also includes a distributed trailing edge (DTE) actuation system including a flap actuator coupled to the wing to move the flap. The flap actuator includes an integrated hydraulic powered actuator and electric powered actuator. The flap actuator is operable in a hydraulic powered mode in which the hydraulic powered actuator is activated to move the flap, an electric powered mode in which the electric powered actuator is activated to move the flap, and a hybrid mode in which the hydraulic powered actuator and the electric powered actuator are activated simultaneously to move the flap.

Example 2 includes the aircraft of Example 1, wherein the DTE actuation system includes a first actuator control electronics (ACE) and a second ACE. The flap actuator is controllable by the first ACE or the second ACE in the hydraulic powered mode, the electric powered mode, and the hybrid mode.

Example 3 includes the aircraft of Example 2, wherein the electric powered actuator is controllable by the first ACE in the electric powered mode and the hybrid mode.

Example 4 includes the aircraft of Example 3, wherein the DTE system includes an electric motor control unit (EMCU) to control the electric powered actuator based on commands from the first ACE.

Example 5 includes the aircraft of Example 4, wherein the DTE system includes a switch electrically coupled between an aircraft electrical system and the EMCU, the switch controllable by the first ACE.

Example 6 includes the aircraft of any of Examples 2-5, wherein the DTE actuation system includes a third ACE. The electric powered actuator of the flap actuator is controlled by the third ACE in the electric powered mode and the hybrid mode.

Example 7 includes the aircraft of any of Examples 1-6, wherein the flap actuator includes a hydraulic control module (HCM) to control the hydraulic powered actuator. The HCM includes a valve operable in a first state to move a crank arm of the flap actuator in a first direction and a second state to move the crank arm in a second direction.

Example 8 includes the aircraft of Example 7, wherein the DTE actuation system includes a first remote electronics unit (REU) and a second REU. The valve is controllable by the first REU or the second REU.

Example 9 includes the aircraft of Example 8, wherein the valve is a first valve. The HCM includes a second valve operable between a first state in which the second valve enables pressurized hydraulic fluid to be supplied to the first valve and a second state in which the second valve shuts off the supply of pressurized hydraulic fluid to the first valve.

Example 10 includes the aircraft of Example 9, wherein the second valve is controllable by the first REU or the second REU.

Example 11 includes the aircraft of Example 10, wherein, when the second valve is supplied with an electrical signal from at least one of the first REU or the second REU, the second valve is controlled to the first state, and when the second valve is not supplied with the electrical signal from at least one of the first REU or the second REU, the second valve is controlled to the second state.

Example 12 includes the aircraft of Example 11, wherein the first valve includes redundant electrically controlled coils interfaced with redundant control channels.

Example 13 includes the aircraft of Example 12, wherein the second valve includes redundant electrically controlled coils interfaced with redundant control channels.

Example 14 is an aircraft including a left wing, a right wing, flaps movable relative to trailing edges of the left and right wings, and a distributed trailing edge (DTE) actuation system. The DTE actuation system includes flap actuators coupled to the left and right wings to move the flaps. Each of the flap actuators is a rotary actuator including an integrated hydraulic powered actuator and electric powered actuator. The DTE actuation system also includes actuator control electronics (ACEs), wherein each of the hydraulic powered actuators of the flap actuators is controllable by at least two of the ACEs.

Example 15 includes the aircraft of Example 14, wherein: the flaps include an outboard left flap, an inboard left flap, an outboard right flap, and an inboard right flap; the ACEs include a first ACE, a second ACE, a third ACE, and a fourth ACE; the first and third ACEs control the hydraulic powered actuators of the flap actuators associated with the outboard left and right flaps; and the second and fourth ACEs control the hydraulic powered actuators of the flap actuators associated with the inboard left and right flaps.

Example 16 includes the aircraft of Example 15, wherein at least one of the electric powered actuators of the flap actuators associated with the outboard left and right flaps is controlled by the second ACE, and wherein at least one of the electric powered actuators of the flap actuators associated with the inboard left and right flaps is controlled by the third ACE.

Example 17 includes the aircraft of any of Examples 14-16, wherein the flap actuators include respective position sensors, and wherein data from the position sensors of two of the flap actuators associated with one of the flaps are processed by the ACEs to ensure position of the two of the flap actuators do not results in an unacceptable force fight threshold and to ensure the positions of the two of the flap actuators are synchronized.

Example 18 is method including determining an engine of an aircraft has failed, wherein failure of the engine causes a reduction in hydraulic power in an aircraft hydraulic system. The aircraft includes a flap actuator to move a flap relative to a trailing edge of a wing. The flap actuator includes an integrated hydraulic powered actuator and electric powered actuator. The method also includes, in response to determining the engine has failed, operating the flap actuator in a hybrid mode in which the hydraulic powered actuator and the electric powered actuator are activated simultaneously to move the flap.

Example 19 includes the method of Example 18, wherein the flap actuator is a rotary actuator.

Example 20 includes the method of Examples 18 or 18, wherein the operating of the flap actuator in the hybrid mode includes: controlling the hydraulic powered actuator via at least one of a first actuator control electronics (ACE) or a second ACE; and controlling the electric powered actuator via the first ACE.

Example 21 is a flap actuator for an aircraft. The flap actuator includes a crank arm rotatable about an axis. The crank arm is to be coupled to a flap of the aircraft via a linkage assembly. The flap actuator also includes a hydraulic powered actuator coupled to the crank arm. The hydraulic powered actuator is to rotate the crank arm when activated. The flap actuator further includes an electric powered actuator coupled to the crank arm. The electric powered actuator is to rotate the crank arm when activated.

Example 22 includes the flap actuator of Example 21, wherein the hydraulic powered actuator includes an integrated piston and rack assembly. The integrated piston and rack assembly includes a rack. The hydraulic powered actuator further includes a pinion gear engaged with the rack. The pinion gear is coupled to the crank arm such that linear movement of the rack rotates the crank arm.

Example 23 includes the flap actuator of Example 22, wherein the pinion gear is coupled to the crank arm via a shaft, and wherein the electric powered actuator is coupled to the shaft.

Example 24 includes the flap actuator of Example 23, wherein the hydraulic powered actuator includes a first housing, and wherein the integrated piston and rack assembly includes a first piston disposed in the first housing. The first piston includes a first sub-piston and a second sub-piston. The rack is coupled between the first sub-piston and the second sub-piston.

Example 25 includes the flap actuator of Example 24, wherein the integrated piston and rack assembly includes first and second tabs disposed on opposite sides of a ridge extending from an inner surface of the first housing. The ridge is engaged by the first and second tabs to prevent the integrated piston and rack assembly from rotating.

Example 26 includes the flap actuator of Examples 24 or 25, wherein the hydraulic powered actuator includes a second housing. The integrated piston and rack assembly includes a second piston disposed in the second housing and a piston rod coupling the first piston and the second piston such that the first and second pistons move together.

Example 27 includes the flap actuator of any of Examples 23-26, wherein the electric powered actuator includes an electric motor having a motor output shaft.

Example 28 includes the flap actuator of Example 27, wherein the motor output shaft is coupled to the shaft via a reduction gear system.

Example 29 includes the flap actuator of Example 28, wherein the reduction gear system includes a position sensor operatively coupled to the shaft.

Example 30 includes the flap actuator of any of Examples 22-29, wherein the electric powered actuator includes an electric brake that couples the motor output shaft and the pinion gear.

Example 31 includes the flap actuator of any of Examples 23-30, further including a no-back coupled to the shaft.

Example 32 is an aircraft including a wing, a flap, and a rotary flap actuator coupled to the wing. The rotary flap actuator is to move the flap between a stowed position and deployed positions. The rotary flap actuator includes an integrated hydraulic powered actuator and electric powered actuator.

Example 33 includes the aircraft of Example 32, wherein the wing includes a support bracket. The hydraulic powered actuator and the electric powered actuator are disposed on opposite sides of the support bracket.

Example 34 includes the aircraft of Examples 32 or 33, wherein the hydraulic powered actuator includes a first housing, a second housing, and an integrated piston and rack assembly. The integrated piston and rack assembly includes a first piston disposed in the first housing, a second piston disposed in the second housing, and a piston rod coupling the first and second pistons.

Example 35 includes the aircraft of Example 34, wherein the first piston includes a first sub-piston and a second sub-piston, and the integrated piston and rack assembly includes a rack coupled between the first and second sub-pistons.

Example 36 includes the aircraft of Example 35, wherein hydraulic powered actuator includes a pinion gear engaged with the rack. The pinion gear is coupled to a crank arm such that linear movement of the rack causes rotation of the crank arm.

Example 37 includes the aircraft of Examples 34 or 35, wherein the integrated piston and rack assembly includes first and second tabs disposed on opposite sides of a ridge extending from an inner surface of the first housing. The ridge is engaged by the first and second tabs to prevent the integrated piston and rack assembly from rotating.

Example 38 is a flap actuator for an aircraft. The flap actuator includes a crank arm, a hydraulic powered actuator coupled to the crank arm, and an electric powered actuator coupled to the crank arm. The hydraulic powered actuator and the electric powered actuator are simultaneously operable to rotate the crank arm.

Example 39 includes the flap actuator of Example 38, further including a shaft coupled to the crank arm. The hydraulic powered actuator is coupled to a first end of the shaft and the electric powered actuator is coupled to a second end of the shaft.

Example 40 includes the flap actuator of Example 39, wherein the hydraulic powered actuator includes a rack and a pinion gear engaged with the rack. The pinion gear is coupled to the shaft, such that linear movement of the rack causes rotation of the crank arm.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An aircraft comprising:
    a wing;
    a flap coupled to the wing, the flap movable between a stowed position and a deployed position; and
    a distributed trailing edge (DTE) actuation system including:
        a flap actuator coupled to the wing to move the flap, the flap actuator including an integrated hydraulic powered actuator and electric powered actuator, the flap actuator operable in a hydraulic powered mode in which the hydraulic powered actuator is activated to move the flap, an electric powered mode in which the electric powered actuator is activated to move the flap, and a hybrid mode in which the hydraulic powered actuator and the electric powered actuator are activated simultaneously to move the flap, the flap actuator including:
            a crank arm;
            a first transmission including a first shaft operatively coupled to the crank arm; and
            a second transmission including a second shaft operatively coupled to the crank arm, the first shaft being axially aligned with the second shaft.

2. The aircraft of claim 1, wherein the flap actuator is a rotary actuator including the crank arm, the crank arm coupled to the flap via a linkage assembly.

3. The aircraft of claim 2, further including a support bracket, the hydraulic powered actuator and the electric powered actuator disposed on opposite sides of the support bracket, and the crank arm positioned between a first shaft and the second shaft.

4. The aircraft of claim 1, further including a support bracket, the hydraulic powered actuator and the electric powered actuator disposed on opposite sides of the support bracket.

5. An aircraft comprising:
    a wing;
    a flap coupled to the wing, the flap movable between a stowed position and a deployed position; and
    a distributed trailing edge (DTE) actuation system including:
        a flap actuator coupled to the wing to move the flap, the flap actuator including an integrated hydraulic powered actuator and electric powered actuator, the flap actuator operable in a hydraulic powered mode in which the hydraulic powered actuator is activated to move the flap, an electric powered mode in which the electric powered actuator is activated to move the flap, and a hybrid mode in which the hydraulic powered actuator and the electric powered actuator are activated simultaneously to move the flap, wherein the flap actuator is a rotary actuator including a crank arm, the crank arm coupled to the flap via a linkage assembly, and wherein the wing includes a support bracket, the hydraulic powered actuator and the electric powered actuator disposed on opposite sides of the support bracket.

6. The aircraft of claim 5, wherein the DTE actuation system includes a first actuator control electronics (ACE) and a second ACE, the flap actuator is controllable by at least one of the first ACE or the second ACE in the at least one of the hydraulic powered mode, the electric powered mode, or the hybrid mode.

7. The aircraft of claim 6, wherein the electric powered actuator is controllable by the first ACE in the electric powered mode and the hybrid mode.

8. The aircraft of claim 7, wherein the DTE system includes an electric motor control unit (EMCU) to control the electric powered actuator based on commands from the first ACE.

9. The aircraft of claim 8, wherein the DTE system includes a switch electrically coupled between an aircraft electrical system and the EMCU, the switch controllable by the first ACE.

10. The aircraft of claim 6, wherein the DTE actuation system includes a third ACE, the electric powered actuator of the flap actuator controlled by the third ACE in the electric powered mode and the hybrid mode.

11. The aircraft of claim 6, wherein the flap is an outboard flap and the flap actuator is a first flap actuator, the aircraft further including:
- an inboard flap coupled to the wing; and
- a second flap actuator coupled to the wing to move the inboard flap, and wherein the DTE includes a third ACE and a fourth ACE, the second flap actuator controllable by the third ACE and the fourth ACE.

12. The aircraft of claim 6, wherein the flap actuator is a first flap actuator, the DTE including a second flap actuator coupled to the wing to move the flap, wherein the first and second flap actuators include respective position sensors, and wherein data from the position sensors of the first and second flap actuators are processed by the first and second ACEs to ensure positions of the first and second flap actuators do not result in an unacceptable force fight threshold and to ensure the positions of the first and second flap actuators are synchronized.

13. The aircraft of claim 5, wherein the flap actuator includes a hydraulic control module (HCM) to control the hydraulic powered actuator, the HCM including a valve operable in a first state to move a crank arm of the flap actuator in a first direction and a second state to move the crank arm in a second direction.

14. The aircraft of claim 13, wherein the DTE actuation system includes a first remote electronics unit (REU) and a second REU, the valve controllable by at least one of the first REU or the second REU.

15. The aircraft of claim 14, wherein the valve is a first valve, the HCM including a second valve operable between a first state in which the second valve enables pressurized hydraulic fluid to be supplied to the first valve and a second state in which the second valve shuts off the supply of pressurized hydraulic fluid to the first valve.

16. The aircraft of claim 15, wherein the second valve is controllable by at least one of the first REU or the second REU.

17. The aircraft of claim 16, wherein, when the second valve is supplied with an electrical signal from at least one of the first REU or the second REU, the second valve is controlled to the first state, and when the second valve is not supplied with the electrical signal from at least one of the first REU or the second REU, the second valve is controlled to the second state.

18. The aircraft of claim 17, wherein the first valve includes redundant electrically controlled coils interfaced with redundant control channels.

19. The aircraft of claim 18, wherein the second valve includes redundant electrically controlled coils interfaced with redundant control channels.

20. A method comprising:
- determining an engine of an aircraft has failed, wherein failure of the engine causes a reduction in hydraulic power in an aircraft hydraulic system, the aircraft including:
  - a wing;
  - a flap coupled to the wing, the flap moveable between a stowed position and a deployed position; and
  - a flap actuator coupled to the wing to move the flap relative to a trailing edge of the wing, the flap actuator including an integrated hydraulic powered actuator and electric powered actuator, the flap actuator operable in a hydraulic powered mode in which the hydraulic powered actuator is activated to move the flap, an electric powered mode in which the electric powered actuator is activated to move the flap, and a hybrid mode in which the hydraulic powered actuator and the electric powered actuator are activated simultaneously to move the flap, wherein the flap actuator is a rotary actuator including a crank arm, the crank arm coupled to the flap via a linkage assembly, and wherein the wing includes a support bracket, the hydraulic powered actuator and the electric powered actuator disposed on opposite sides of the support bracket; and
- in response to determining the engine has failed, operating the flap actuator in the hybrid mode in which the hydraulic powered actuator and the electric powered actuator are activated simultaneously to move the flap.

21. The method of claim 20, wherein the operating of the flap actuator in the hybrid mode includes:
- controlling the hydraulic powered actuator via at least one of a first actuator control electronics (ACE) or a second ACE; and
- controlling the electric powered actuator via the first ACE.

* * * * *